(12) United States Patent
Tian et al.

(10) Patent No.: US 10,853,118 B2
(45) Date of Patent: Dec. 1, 2020

(54) APPARATUS AND METHOD FOR PATTERN-DRIVEN PAGE TABLE SHADOWING FOR GRAPHICS VIRTUALIZATION

(71) Applicant: Intel Corporation, Santa Clara, CA (US)

(72) Inventors: Kun Tian, Shanghai (CN); Yao Zu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 16/062,426

(22) PCT Filed: Dec. 21, 2015

(86) PCT No.: PCT/CN2015/098046
§ 371 (c)(1),
(2) Date: Jun. 14, 2018

(87) PCT Pub. No.: WO2017/107001
PCT Pub. Date: Jun. 29, 2017

(65) Prior Publication Data
US 2018/0373556 A1    Dec. 27, 2018

(51) Int. Cl.
*G06F 9/455* (2018.01)
*G06T 1/20* (2006.01)
(Continued)

(52) U.S. Cl.
CPC ...... *G06F 9/45558* (2013.01); *G06F 9/45508* (2013.01); *G06F 9/45533* (2013.01);
(Continued)

(58) Field of Classification Search
None
See application file for complete search history.

(56) References Cited

U.S. PATENT DOCUMENTS

2014/0373005 A1   12/2014   Agrawal et al.
2015/0067672 A1    3/2015   Mitra et al.

FOREIGN PATENT DOCUMENTS

CN         102421012 A       6/2012

OTHER PUBLICATIONS

PCT Notification of Transmittal (3 pages) of the International Search Report (4 pages) and the Written Opinion (4 pages) of the International Searching Authority, or the Declaration from PCT/CN2015/098046, dated Jul. 27, 2016, (11 pages total).

*Primary Examiner* — Vu Nguyen
(74) *Attorney, Agent, or Firm* — Nicholson De Vos Webster & Elliott LLP

(57) ABSTRACT

An apparatus and method are described for pattern driven page table updates. For example, one embodiment of an apparatus comprises a graphics processing unit (GPU) to process graphics commands and responsively render a plurality of image frames; a hypervisor to virtualize the GPU to share the GPU among a plurality of virtual machines (VMs); a first guest page table managed within a first VM, the first guest page table comprising a plurality of page table entries; a first shadow page table managed by the hypervisor and comprising page table entries corresponding to the page table entries of the first guest page table; and a command parser to analyze a current working set of commands submitted from the first VM to the GPU, the command parser to responsively update the first shadow page table responsive to determining a set of page table entries predicted to be used based on the analysis of the working set of commands.

12 Claims, 21 Drawing Sheets

(51) Int. Cl.
*G06F 9/48* (2006.01)
*G06F 9/50* (2006.01)
(52) U.S. Cl.
CPC .......... *G06F 9/4881* (2013.01); *G06F 9/5077* (2013.01); *G06T 1/20* (2013.01); *G06F 2009/45579* (2013.01); *G06F 2009/45583* (2013.01)

APPARATUS AND METHOD FOR PATTERN-DRIVEN PAGE TABLE SHADOWING FOR GRAPHICS VIRTUALIZATION

CROSS-REFERENCE TO RELATED APPLICATION

This patent application is a U.S. National Phase Application under 35 U.S.C. § 371 of International Application No. PCT/CN2015/098046, filed Dec. 21, 2015, entitled APPARATUS AND METHOD FOR PATTERN-DRIVEN PAGE TABLE SHADOWING FOR GRAPHICS VIRTUALIZATION.

BACKGROUND

Field of the Invention

This invention relates generally to the field of computer processors. More particularly, the invention relates to an apparatus and method for pattern-driven page table shadowing for graphics virtualization.

Description of the Related Art

Rapid advances have recently taken place in graphics processor unit (GPU) virtualization. Virtualized graphics processing environments are used, for example, in the media cloud, remote workstations/desktops, In-Vehicle Infotainment (IVI), rich client virtualization, to name a few. Certain architectures perform full GPU virtualization through trap-and-emulation to emulate a full-featured virtual GPU (vGPU) while still providing near-to-native performance by passing through performance-critical graphics memory resources.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
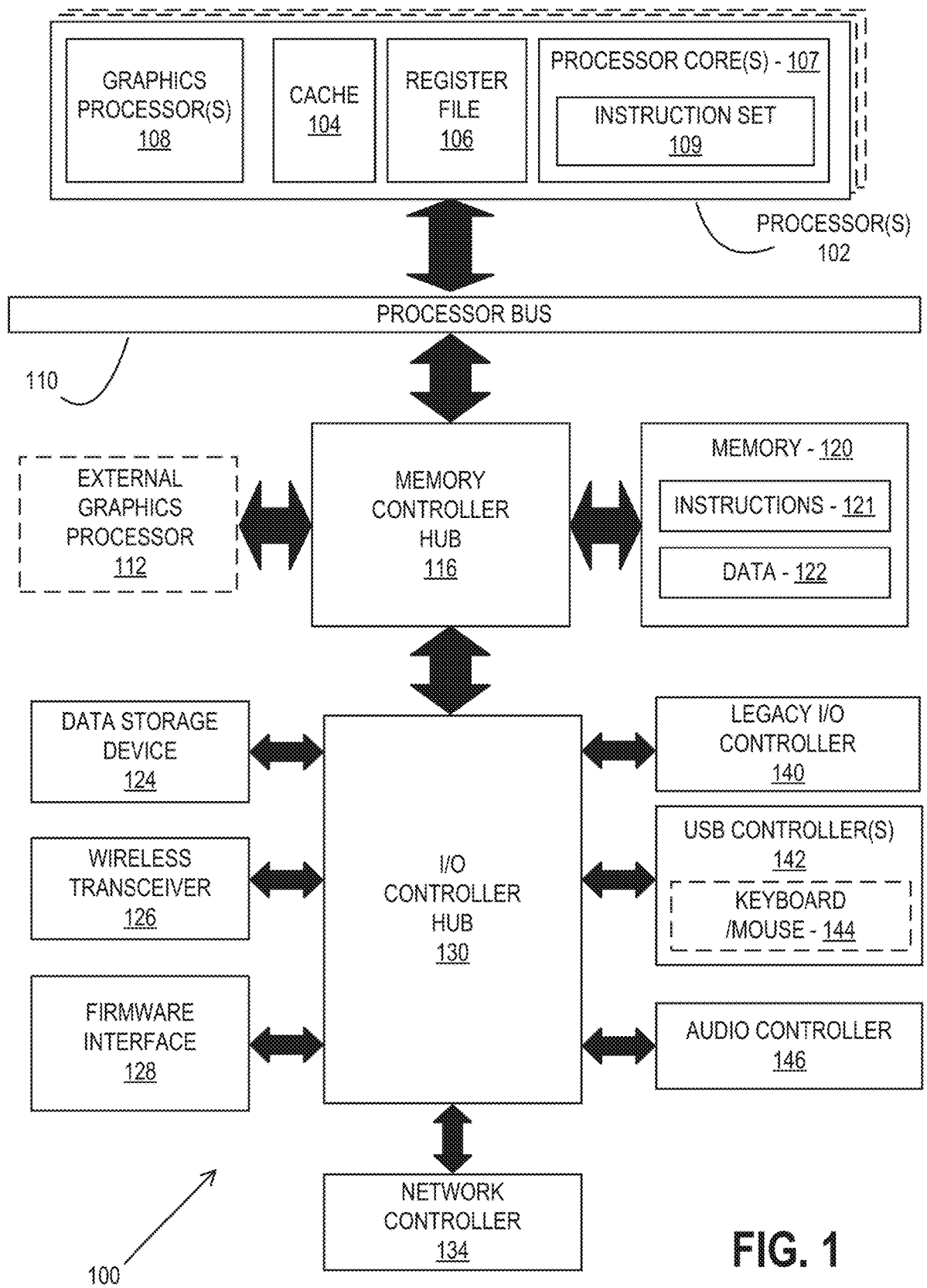
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
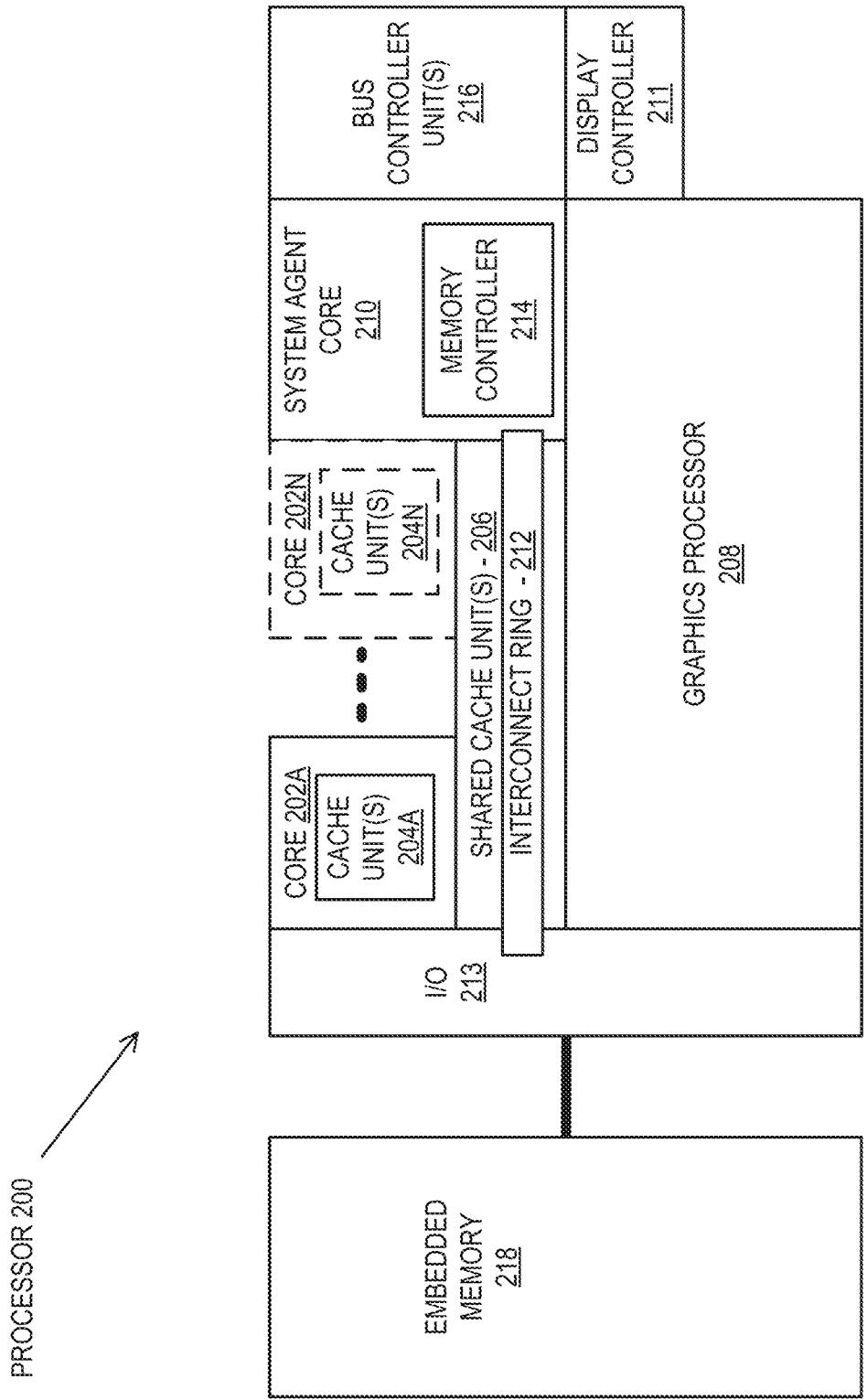
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
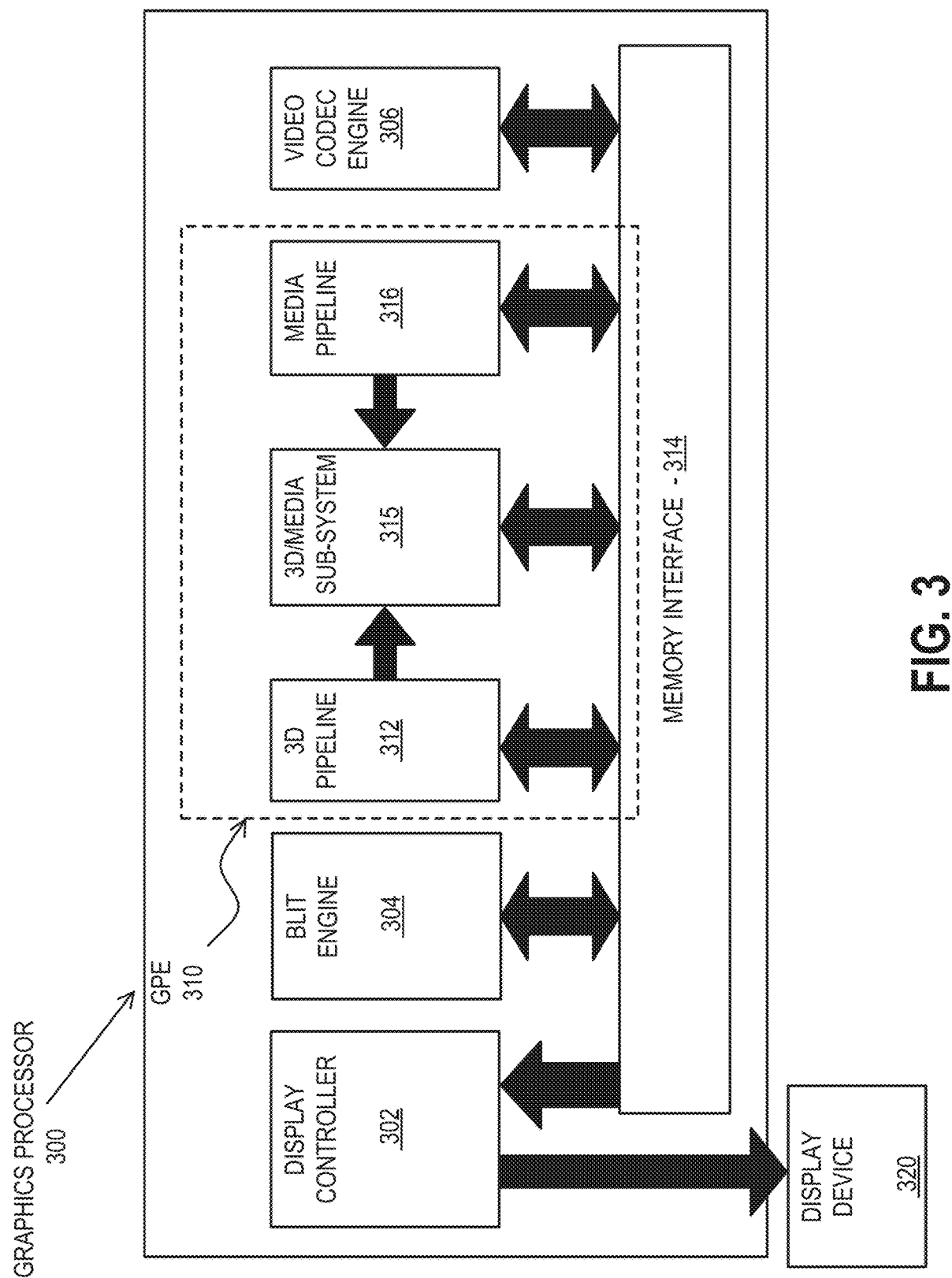
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
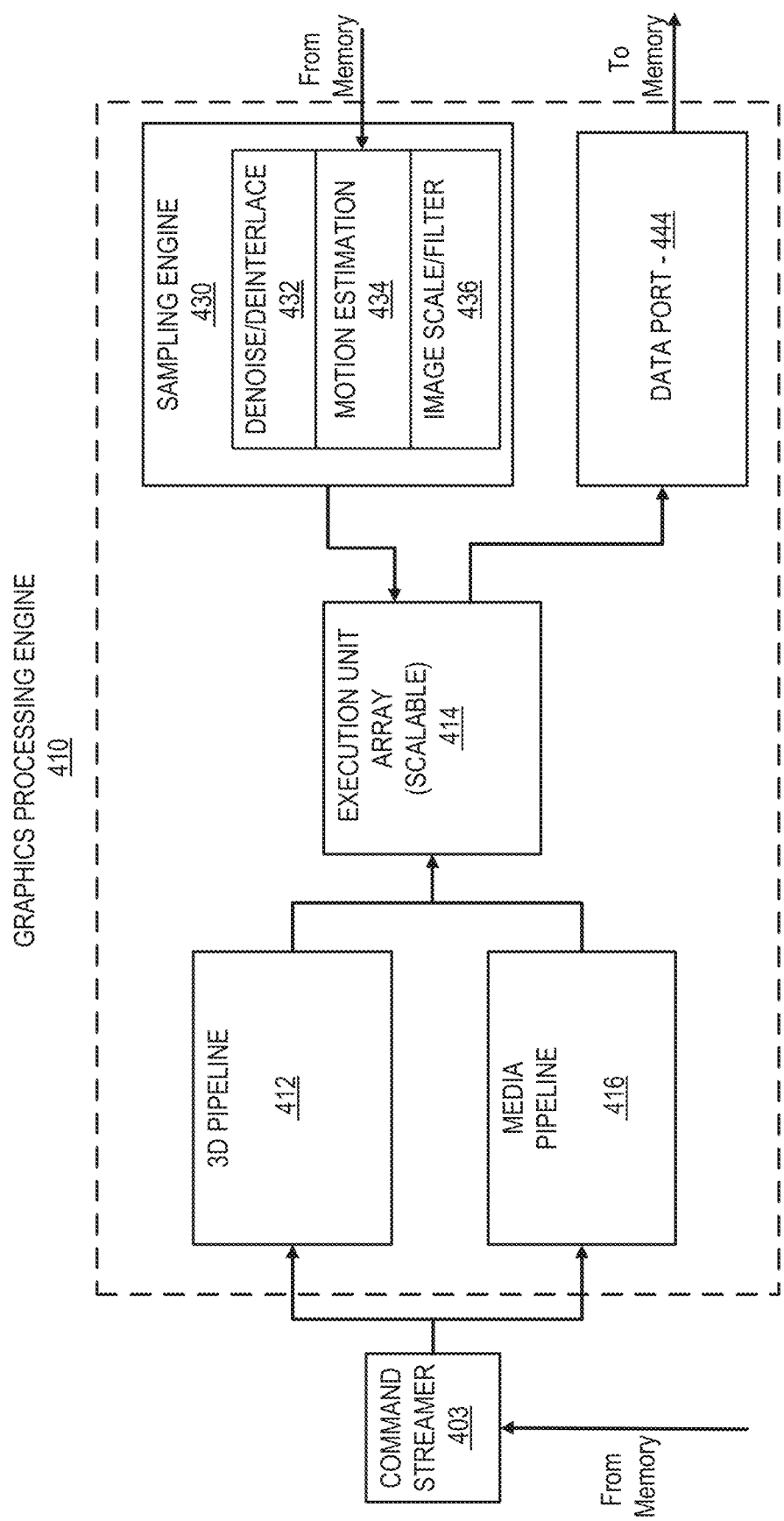
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
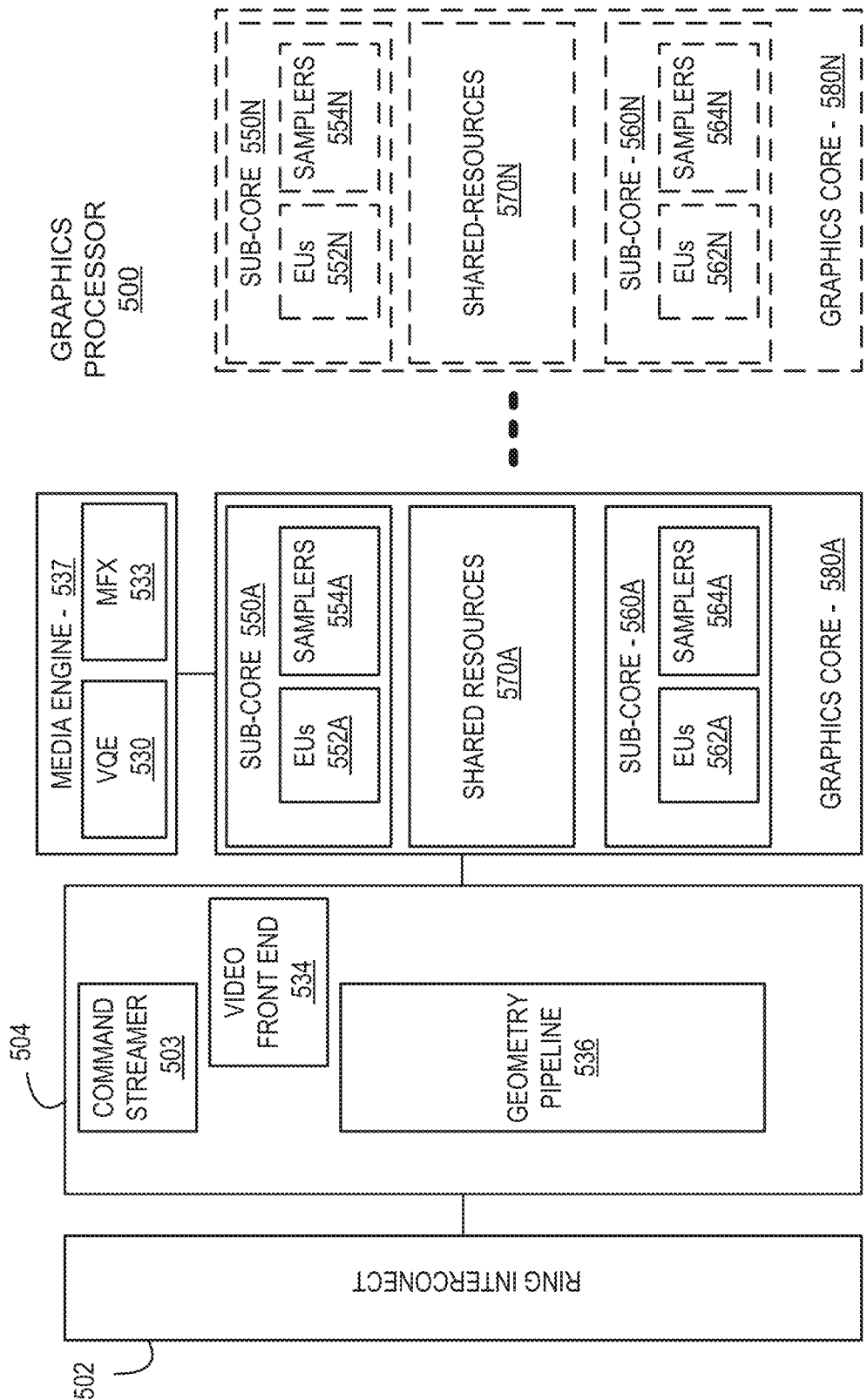
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
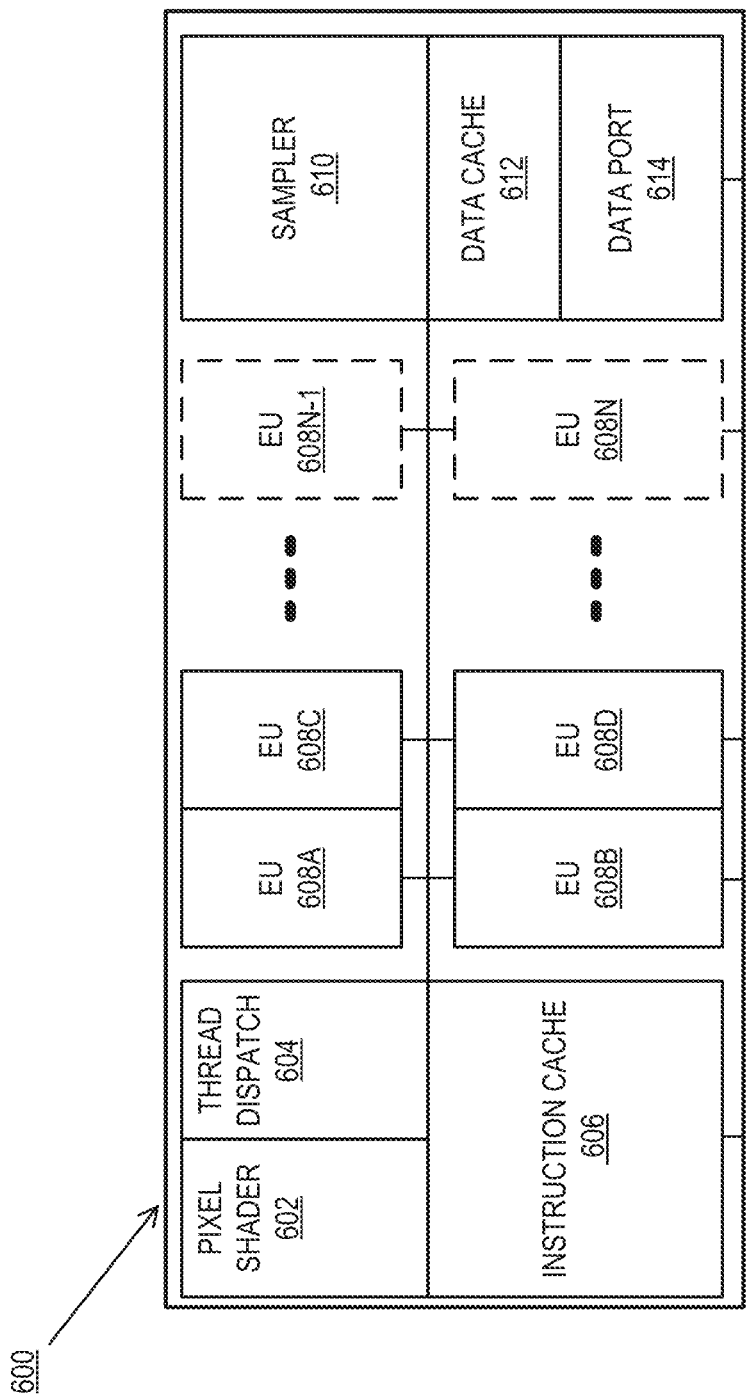
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
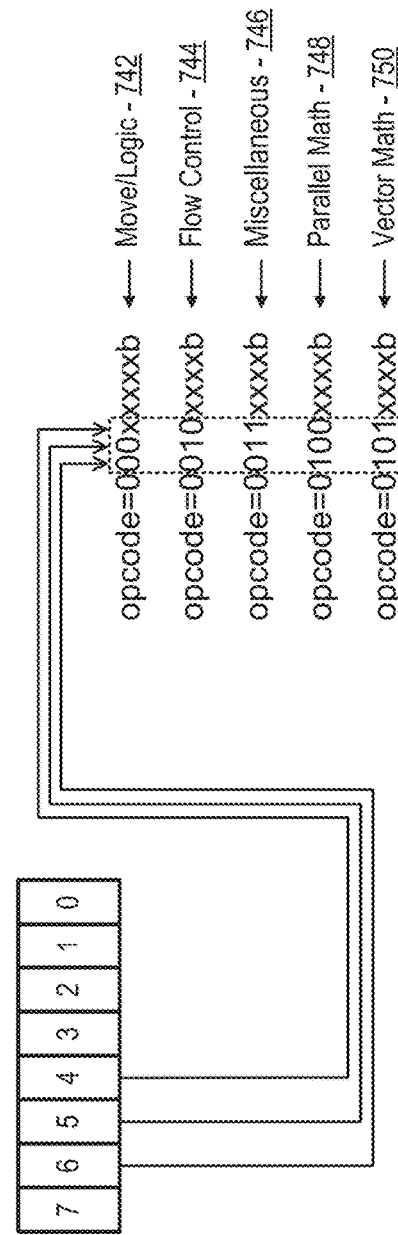
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
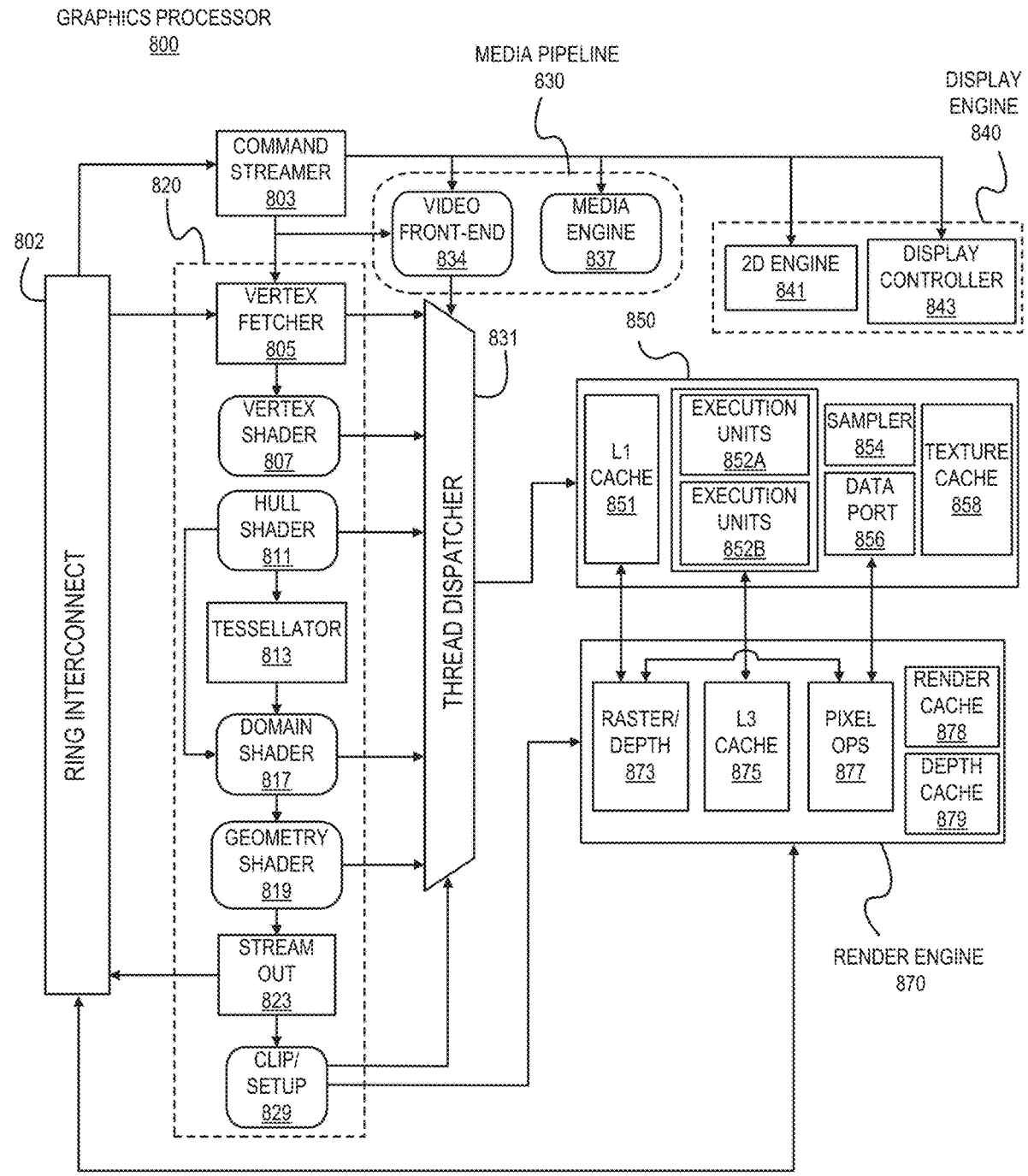
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
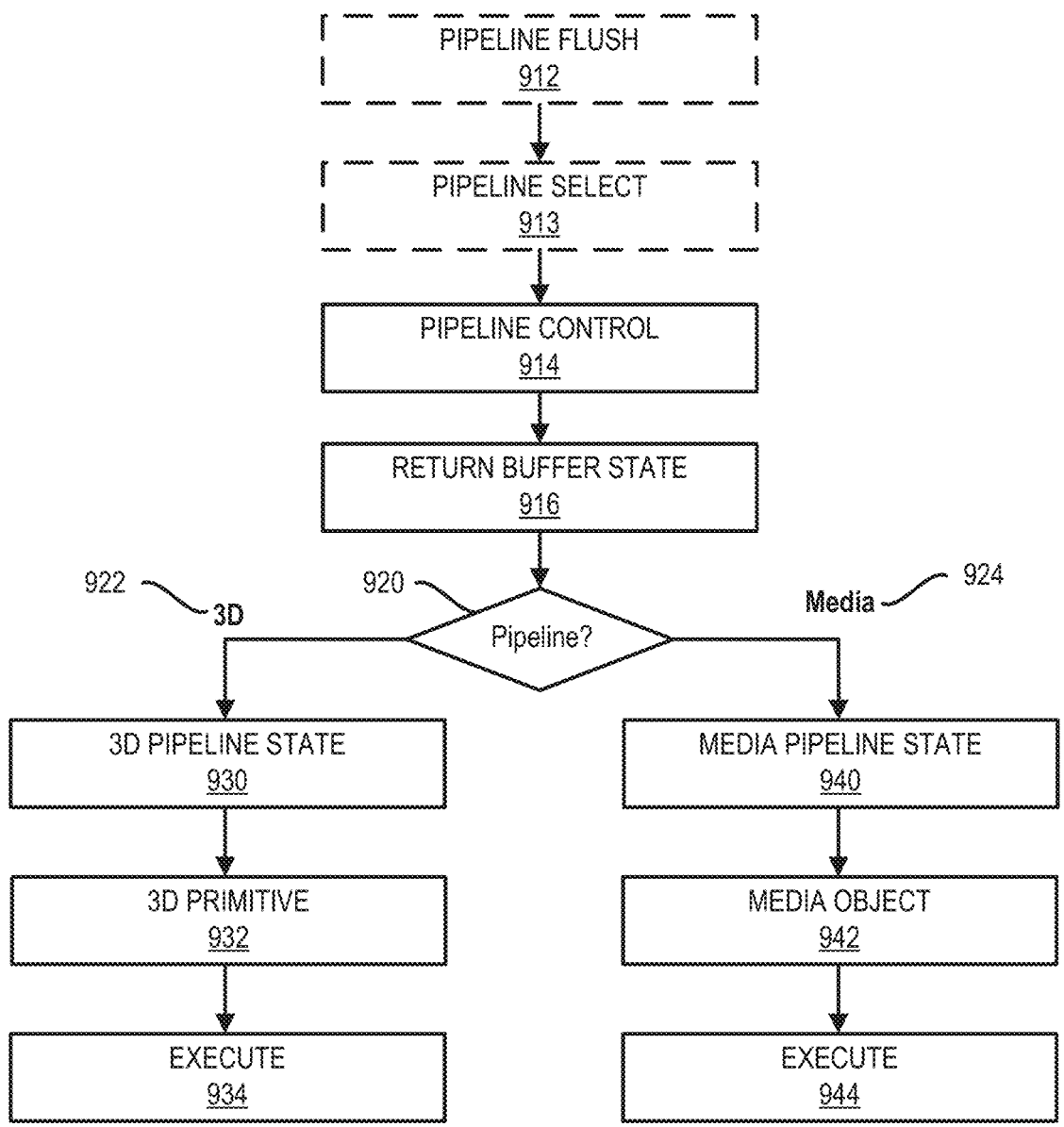
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated.

Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
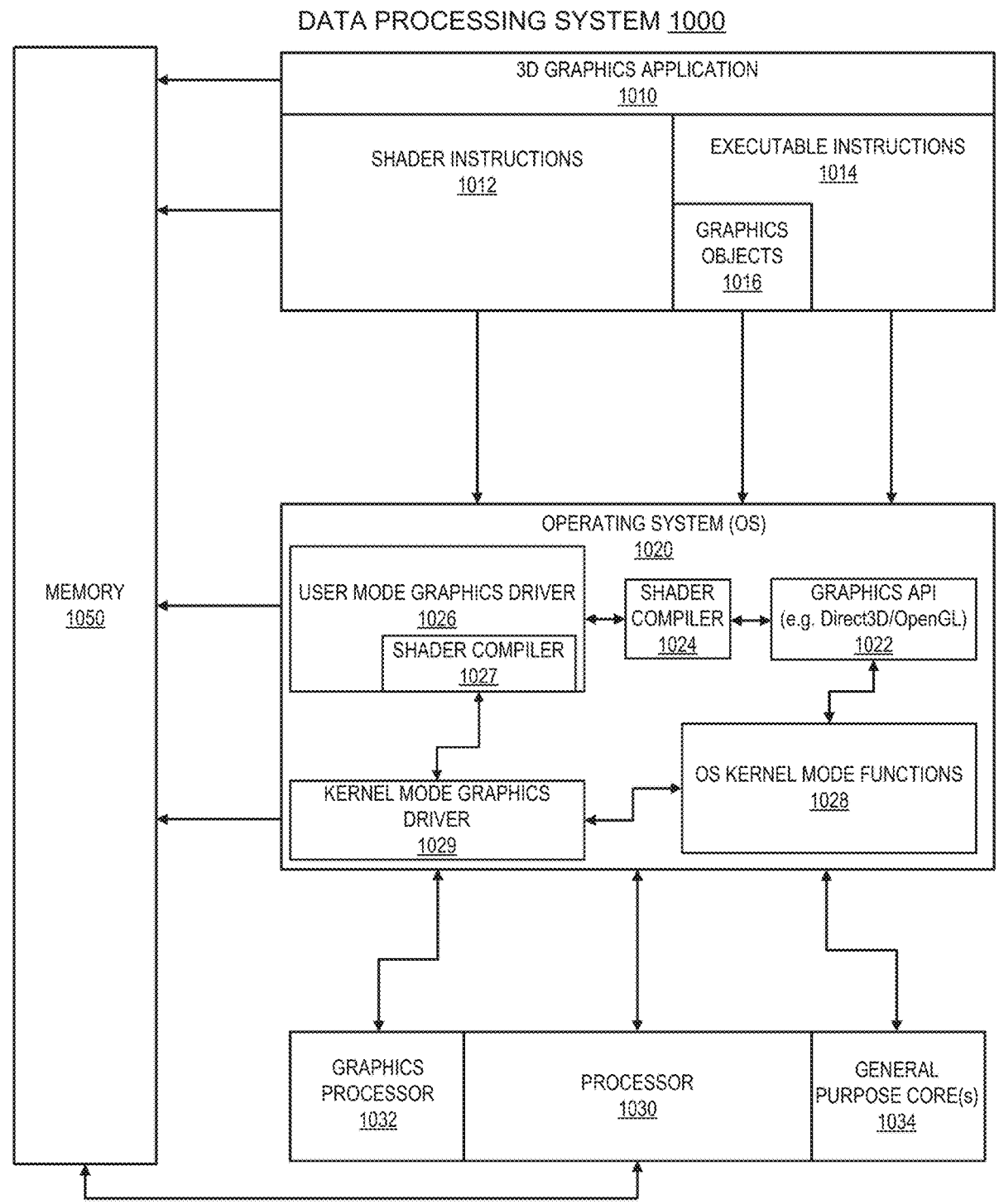
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
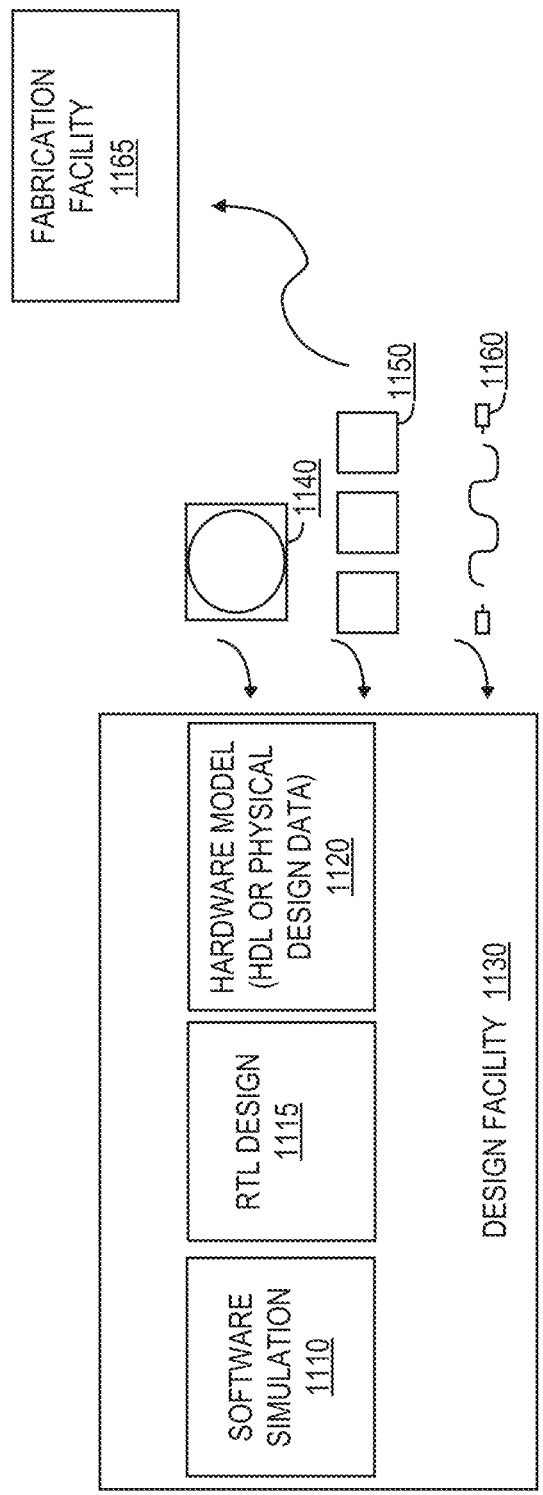
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
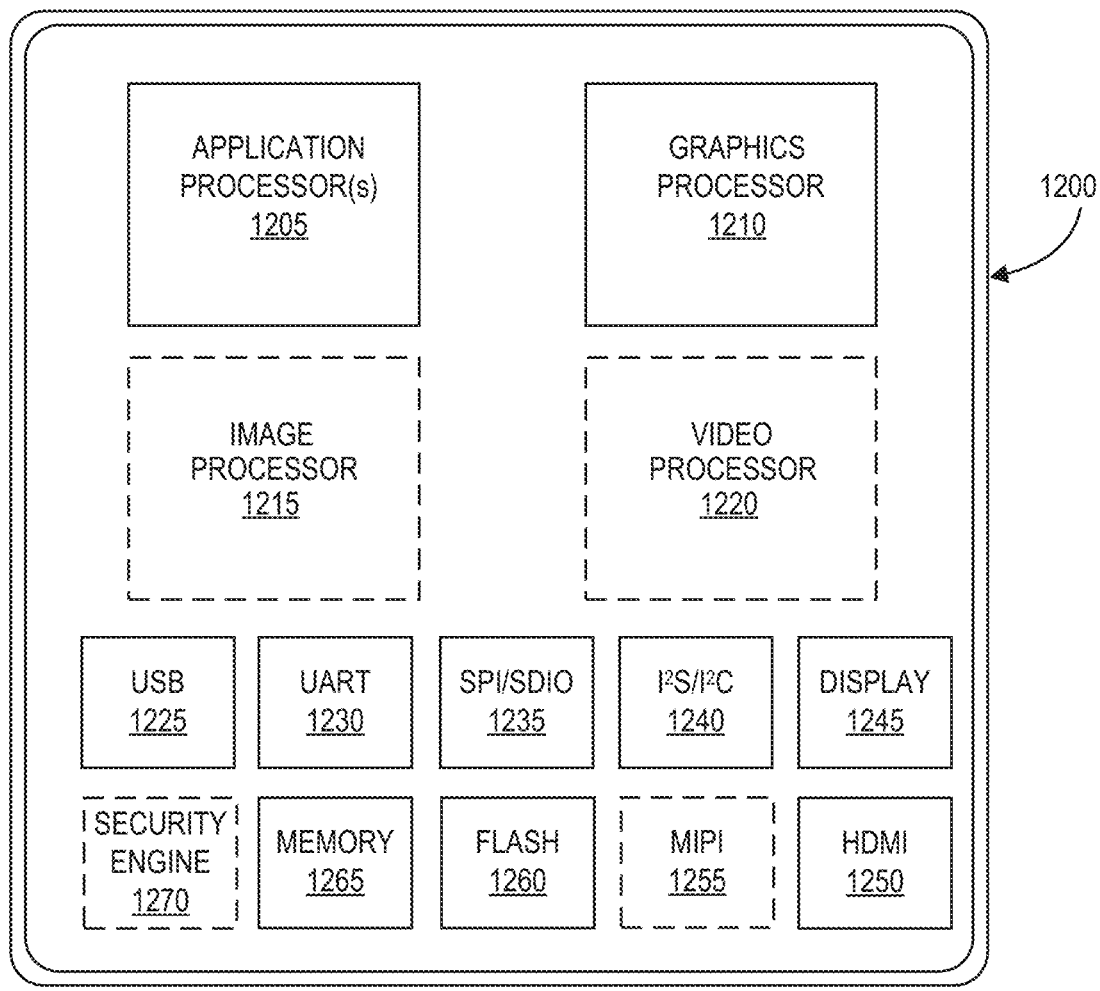
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Exemplary Graphics Virtualization Architectures and Techniques

Some embodiments of the invention are implemented on a platform utilizing full graphics processor unit (GPU) virtualization. As such, an overview of the GPU virtualization techniques employed in one embodiment of the invention is provided below, followed by a detailed description of an apparatus and method for pattern-driven page table shadowing.

One embodiment of the invention employs a full GPU virtualization environment running a native graphics driver in the guest, and mediated pass-through that achieves both good performance, scalability, and secure isolation among guests. This embodiment presents a virtual full-fledged GPU to each virtual machine (VM) which can directly access performance-critical resources without intervention from the hypervisor in most cases, while privileged operations from the guest are trap-and-emulated at minimal cost. In one embodiment, a virtual GPU (vGPU), with full GPU features, is presented to each VM. VMs can directly access performance-critical resources, without intervention from the hypervisor in most cases, while privileged operations from the guest are trap-and-emulated to provide secure isolation among VMs. The vGPU context is switched per quantum, to share the physical GPU among multiple VMs.

Figure 13:
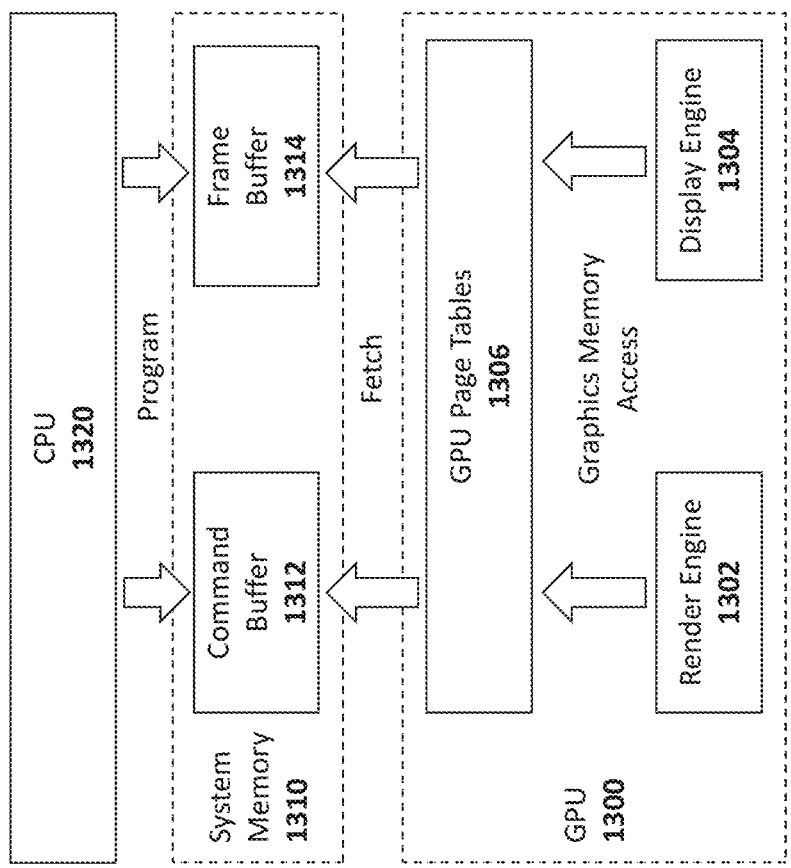
FIG. 13 illustrates an graphics processing system.

FIG. 13 illustrates a high level system architecture on which embodiments of the invention may be implemented which includes a graphics processing unit (GPU) 1300, a central processing unit (CPU) 1320, and a system memory 1310 shared between the GPU 1300 and the CPU 1320. A render engine 1302 fetches GPU commands from a command buffer 1312 in system memory 1310, to accelerate graphics rendering using various different features. The display engine 1304 fetches pixel data from the frame buffer 1314 and then sends the pixel data to external monitors for display.

The illustrated architecture abstraction applies to most modern GPUs but may differ in how graphics memory is implemented. Certain architectures use system memory 1310 as graphics memory, while other GPUs may use on-die memory. System memory 1310 may be mapped into multiple virtual address spaces by GPU page tables 1306.

A 2 GB global virtual address space, called global graphics memory, accessible from both the GPU 1300 and CPU 1320, is mapped through global page table. Local graphics memory spaces are supported in the form of multiple 2 GB local virtual address spaces, but are only limited to access from the render engine 1302, through local page tables. Global graphics memory is mostly the frame buffer 1314, but also serves as the command buffer 1312. Large data accesses are made to local graphics memory when hardware acceleration is in progress. Similar page table mechanisms are employed by GPUs with on-die memory.

In one embodiment, the CPU 1320 programs the GPU 1300 through GPU-specific commands, shown in FIG. 13, in a producer-consumer model. The graphics driver programs GPU commands into the command buffer 1312, including a primary buffer and a batch buffer, according to high level programming APIs like OpenGL and DirectX. The GPU 1300 then fetches and executes the commands. The primary buffer, a ring buffer, may chain other batch buffers together. The terms "primary buffer" and "ring buffer" are used interchangeably hereafter. The batch buffer is used to convey the majority of the commands (up to ~98%) per programming model. A register tuple (head, tail) is used to control the ring buffer. In one embodiment, the CPU 1320 submits the commands to the GPU 1300 by updating the tail, while the GPU 1300 fetches commands from head, and then notifies the CPU 1320 by updating the head, after the commands have finished execution.

As mentioned, one embodiment of the invention is implemented in a full GPU virtualization platform with mediated pass-through. As such, every VM is presented with a full-fledged GPU to run a native graphics driver inside a VM. The challenge, however, is significant in three ways: (1) complexity in virtualizing an entire sophisticated modern GPU, (2) performance due to multiple VMs sharing the GPU, and (3) secure isolation among the VMs without any compromise.

Figure 14:
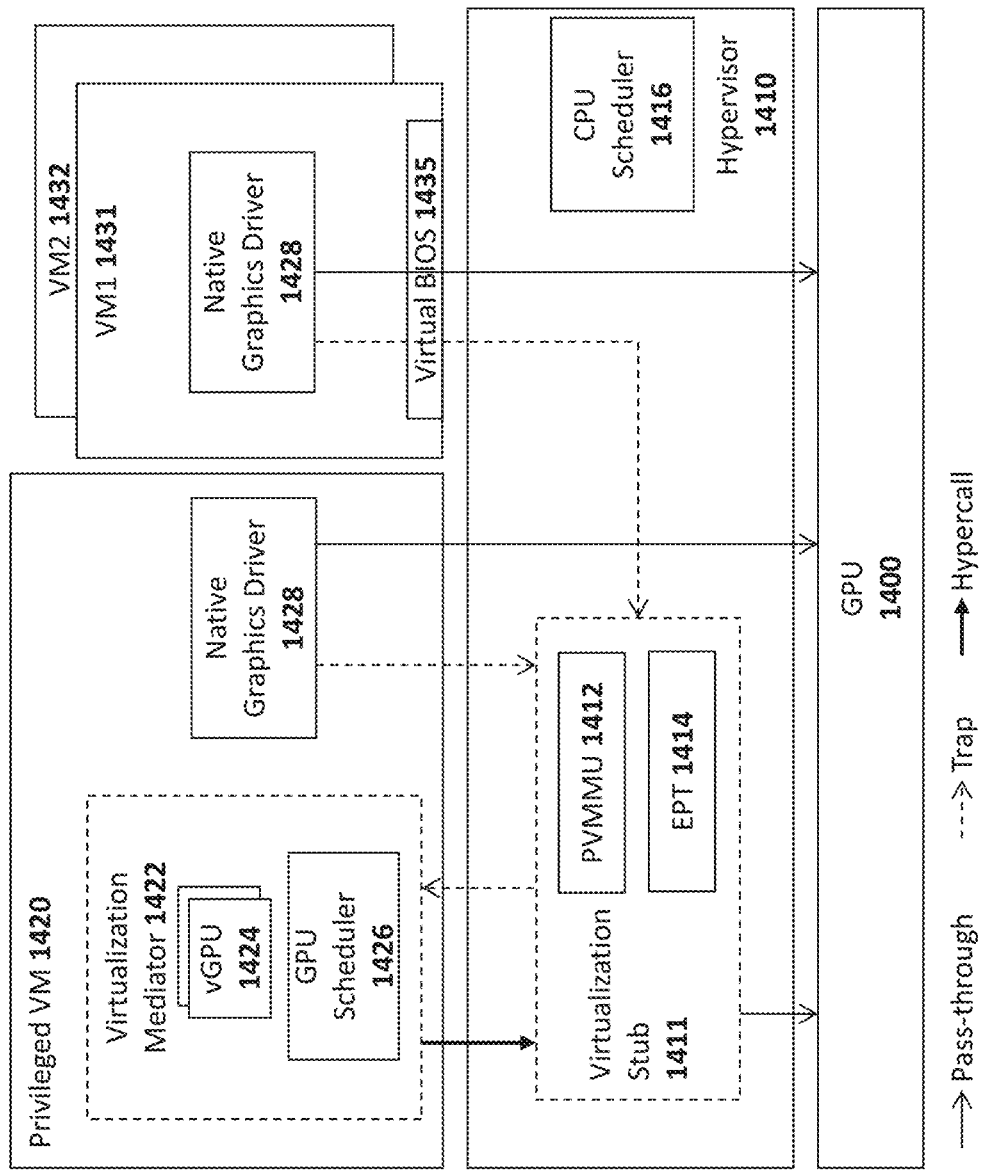
FIG. 14 illustrates an exemplary architecture for full graphics virtualization.

FIG. 14 illustrates a GPU virtualization architecture in accordance with one embodiment of the invention which includes a hypervisor 1410 running on a GPU 1400, a privileged virtual machine (VM) 1420 and one or more user VMs 1431-1432. A virtualization stub module 1411 running in the hypervisor 1410 extends memory management to include extended page tables (EPT) 1414 for the user VMs 1431-1432 and a privileged virtual memory management unit (PVMMU) 1412 for the privileged VM 1420, to implement the policies of trap and pass-through. In one embodiment, each VM 1420, 1431-1432 runs the native graphics driver 1428 which can directly access the performance-critical resources of the frame buffer and the command buffer, with resource partitioning as described below. To protect privileged resources, that is, the I/O registers and PTEs, corresponding accesses from the graphics drivers 1428 in user VMs 1431-1332 and the privileged VM 1420, are trapped and forwarded to the virtualization mediator 1422 in the privileged VM 1420 for emulation. In one embodiment, the virtualization mediator 1422 uses hypercalls to access the physical GPU 1400 as illustrated.

In addition, in one embodiment, the virtualization mediator 1422 implements a GPU scheduler 1426, which runs concurrently with the CPU scheduler 1416 in the hypervisor 1410, to share the physical GPU 1400 among the VMs 1431-1432. One embodiment uses the physical GPU 1400 to directly execute all the commands submitted from a VM, so it avoids the complexity of emulating the render engine, which is the most complex part within the GPU. In the meantime, the resource pass-through of both the frame buffer and command buffer minimizes the hypervisor's 1410 intervention on CPU accesses, while the GPU scheduler 1426 guarantees every VM a quantum for direct GPU execution. Consequently, the illustrated embodiment achieves good performance when sharing the GPU among multiple VMs.

In one embodiment, the virtualization stub 1411 selectively traps or passes-through guest access of certain GPU resources. The virtualization stub 1411 manipulates the EPT 1414 entries to selectively present or hide a specific address range to user VMs 1431-1432, while uses a reserved bit of PTEs in the PVMMU 1412 for the privileged VM 1420, to selectively trap or pass-through guest accesses to a specific address range. In both cases, the peripheral input/output (PIO) accesses are trapped. All the trapped accesses are forwarded to the virtualization mediator 1422 for emulation while the virtualization mediator 1411 uses hypercalls to access the physical GPU 1400.

As mentioned, in one embodiment, the virtualization mediator 1422 emulates virtual GPUs (vGPUs) 1424 for privileged resource accesses, and conducts context switches amongst the vGPUs 1424. In the meantime, the privileged VM 1420 graphics driver 1428 is used to initialize the physical device and to manage power. One embodiment takes a flexible release model, by implementing the virtualization mediator 1422 as a kernel module in the privileged VM 1420, to ease the binding between the virtualization mediator 1422 and the hypervisor 1410.

A split CPU/GPU scheduling mechanism is implemented via the CPU scheduler 1416 and GPU scheduler 1426. This is done because of the cost of a GPU context switch may be over 1000 times the cost of a CPU context switch (e.g., ~700 us vs. ~300 ns). In addition, the number of the CPU cores likely differs from the number of the GPU cores in a computer system. Consequently, in one embodiment, a GPU scheduler 1426 is implemented separately from the existing CPU scheduler 1416. The split scheduling mechanism leads to the requirement of concurrent accesses to the resources from both the CPU and the GPU. For example, while the CPU is accessing the graphics memory of VM1 1431, the GPU may be accessing the graphics memory of VM2 1432, concurrently.

As discussed above, in one embodiment, a native graphics driver 1428 is executed inside each VM 1420, 1431-1432, which directly accesses a portion of the performance-critical resources, with privileged operations emulated by the virtualization mediator 1422. The split scheduling mechanism leads to the resource partitioning design described below. To support resource partitioning better, one embodiment reserves a Memory-Mapped I/O (MMIO) register window, sometimes referred to as "virt_info", to convey the resource partitioning information to the VM.

In one embodiment, the location and definition of virt_info has been pushed to the hardware specification as a virtualization extension so the graphics driver 1428 handles the extension natively, and future GPU generations follow the specification for backward compatibility.

While illustrated as a separate component in FIG. 14, in one embodiment, the privileged VM 1420 including the virtualization mediator 1422 (and its vGPU instances 1424 and GPU scheduler 1426) is implemented as a module within the hypervisor 1410.

In one embodiment, the virtualization mediator 1422 manages vGPUs 1424 of all VMs, by trap-and-emulating the privileged operations. The virtualization mediator 1422 handles the physical GPU interrupts, and may generate virtual interrupts to the designated VMs 1431-1432. For example, a physical completion interrupt of command execution may trigger a virtual completion interrupt, delivered to the rendering owner. The idea of emulating a vGPU instance per semantics is simple; however, the implementation involves a large engineering effort and a deep understanding of the GPU 1400. For example, approximately 700 I/O registers may be accessed by certain graphics drivers.

In one embodiment, the GPU scheduler 1426 implements a coarse-grain quality of service (QoS) policy. A particular time quantum may be selected as a time slice for each VM 1431-1432 to share the GPU 1400 resources. For example, in one embodiment, a time quantum of 16 ms is selected as the scheduling time slice, because this value results in a low human perceptibility to image changes. Such a relatively large quantum is also selected because the cost of the GPU context switch is over 1000× that of the CPU context switch, so it can't be as small as the time slice in the CPU scheduler 1416. The commands from a VM 1431-1432 are submitted to the GPU 1400 continuously, until the guest/VM runs out of its time-slice. In one embodiment, the GPU scheduler 1426 waits for the guest ring buffer to become idle before switching, because most GPUs today are non-preemptive, which may impact fairness. To minimize the wait overhead, a coarse-grain flow control mechanism may be implemented, by tracking the command submission to guarantee the piled commands, at any time, are within a certain limit. Therefore, the time drift between the allocated time slice and the execution time is relatively small, compared to the large quantum, so a coarse-grain QoS policy is achieved.

In one embodiment, on a render context switch, the internal pipeline state and I/O register states are saved and restored, and a cache/TLB flush is performed, when switching the render engine among vGPUs 1424. The internal pipeline state is invisible to the CPU, but can be saved and restored through GPU commands. Saving/restoring I/O register states can be achieved through reads/writes to a list of the registers in the render context. Internal caches and Translation Lookaside Buffers (TLB) included in modern GPUs to accelerate data accesses and address translations, must be flushed using commands at the render context switch, to guarantee isolation and correctness. The steps used to switch a context in one embodiment are: 1) save current I/O states, 2) flush the current context, 3) use the additional commands to save the current context, 4) use the additional commands to restore the new context, and 5) restore I/O state of the new context.

As mentioned, one embodiment uses a dedicated ring buffer to carry the additional GPU commands. The (audited) guest ring buffer may be reused for performance, but it is not safe to directly insert the commands into the guest ring buffer, because the CPU may continue to queue more commands, leading to overwritten content. To avoid a race condition, one embodiment switches from the guest ring buffer to its own dedicated ring buffer. At the end of the context switch, this embodiment switches from the dedicated ring buffer to the guest ring buffer of the new VM.

One embodiment reuses the privileged VM 1420 graphics driver to initialize the display engine, and then manages the display engine to show different VM frame buffers.

When two vGPUs 1424 have the same resolution, only the frame buffer locations are switched. For different resolutions, the privileged VM may use a hardware scalar, a common feature in modern GPUs, to scale the resolution up and down automatically. Both techniques take mere milliseconds. In many cases, display management may not be needed such as when the VM is not shown on the physical display (e.g., when it is hosted on the remote servers).

As illustrated in FIG. 14, one embodiment passes through the accesses to the frame buffer and command buffer to accelerate performance-critical operations from a VM 1431-1432. For the global graphics memory space, 2 GB in size, graphics memory resource partitioning and address space ballooning techniques may be employed. For the local graphics memory spaces, each also with a size of 2 GB, a per-VM local graphics memory may be implemented through the render context switch, due to local graphics memory being accessible only by the GPU 1400.

Figure 15:
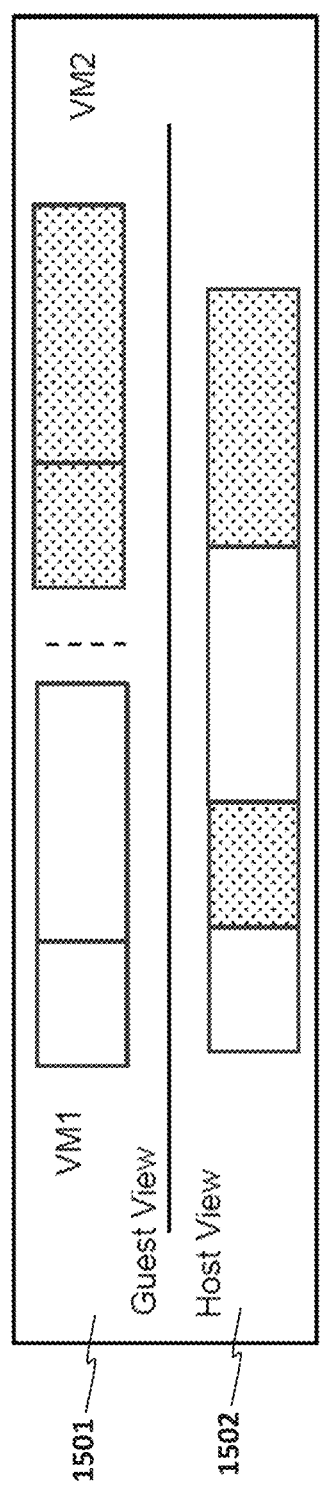
FIG. 15 illustrates an exemplary guest view and a host view for a system memory space.

As mentioned, one embodiment partitions the global graphics memory among VMs 1431-1432. As explained above, a split CPU/GPU scheduling mechanism requires that the global graphics memory of different VMs can be accessed simultaneously by the CPU and the GPU, so each VM must be presented at any time with its own resources, leading to the resource partitioning approach for global graphics memory, as illustrated in FIG. 15. In particular, FIG. 15 shows a guest view 1501 of graphics memory for VM1 and VM2, and a corresponding host view 1502.

Resource partitioning reveals an interesting problem: the guest and host now have an inconsistent view of the global graphics memory. The guest graphics driver 1428 is unaware of the partitioning, assuming exclusive ownership: the global graphics memory is contiguous, starting from address zero. One embodiment translates between the host view 1502 and the guest view 1501, for any graphics address, before being accessed by the CPU and GPU. It therefore incurs more complexity and additional overhead, such as additional accesses to the command buffer (usually mapped as un-cacheable and thus slow on access).

Figure 16:
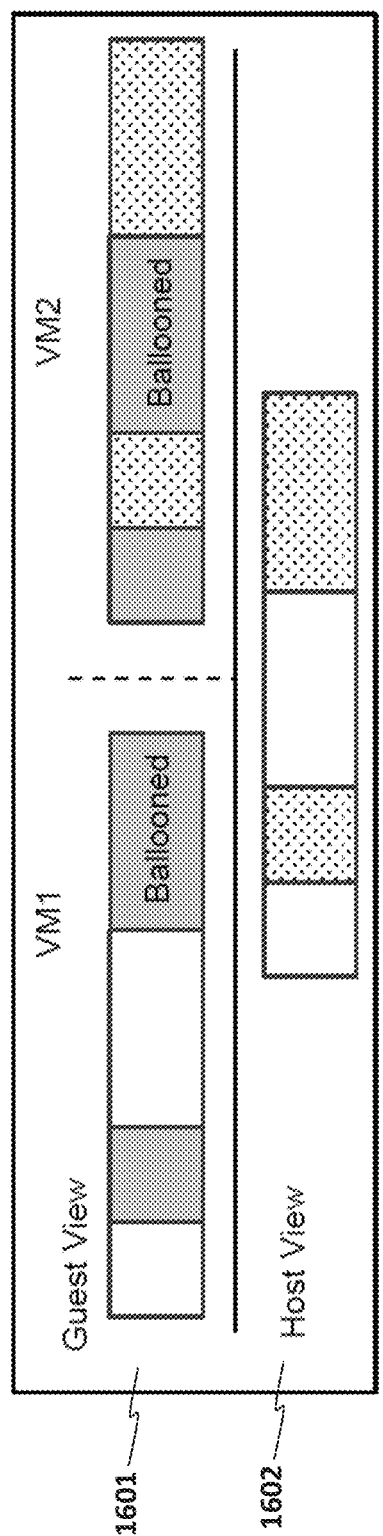
FIG. 16 illustrates an exemplary guest view and a host view for a system memory space utilizing ballooning.

One embodiment uses a technique known as "address space ballooning" to eliminate the address translation overhead. An example is illustrated in FIG. 16 which shows a guest view 1601 for VM1 and VM2 and a host view 1602 for memory partitioning. One embodiment exposes the partitioning information to the VM graphics driver 1428, through the virt_info MMIO window. One embodiment of the graphics driver 1428 marks other VMs' regions as "ballooned", and reserves them from its graphics memory allocation. With this design, the guest view 1601 of global graphics memory space is exactly the same as the host view 1602 as illustrated, and the driver-programmed addresses, using guest physical addresses, can be directly used by the hardware. Address space ballooning is different from traditional memory ballooning techniques. Memory ballooning is for memory usage control, concerning the number of ballooned pages, while address space ballooning is to balloon special memory address ranges.

Another benefit of address space ballooning is that the guest command buffer may be used directly, without any address translation overhead, for direct GPU execution. This simplifies the implementation significantly, by eliminating the need for a shadow command buffer, in addition to providing performance guarantees. However, such scheme may be susceptible to security violations. In one embodiment, this issue is addressed with smart shadowing, by auditing and protecting the command buffer from malicious attacks, as discussed below.

In one embodiment, each VM is permitted to use the full local graphics memory spaces, on its own, similar to the virtual address spaces on CPU. The local graphics memory spaces are only visible to the render engine in the GPU 1400. So any valid local graphics memory address programmed by a VM 1431-1432 can be used directly by the GPU 1400. The virtualization mediator 1420 switches the local graphics memory spaces, between VMs 1431-1432, when switching the render ownership.

Figure 17:
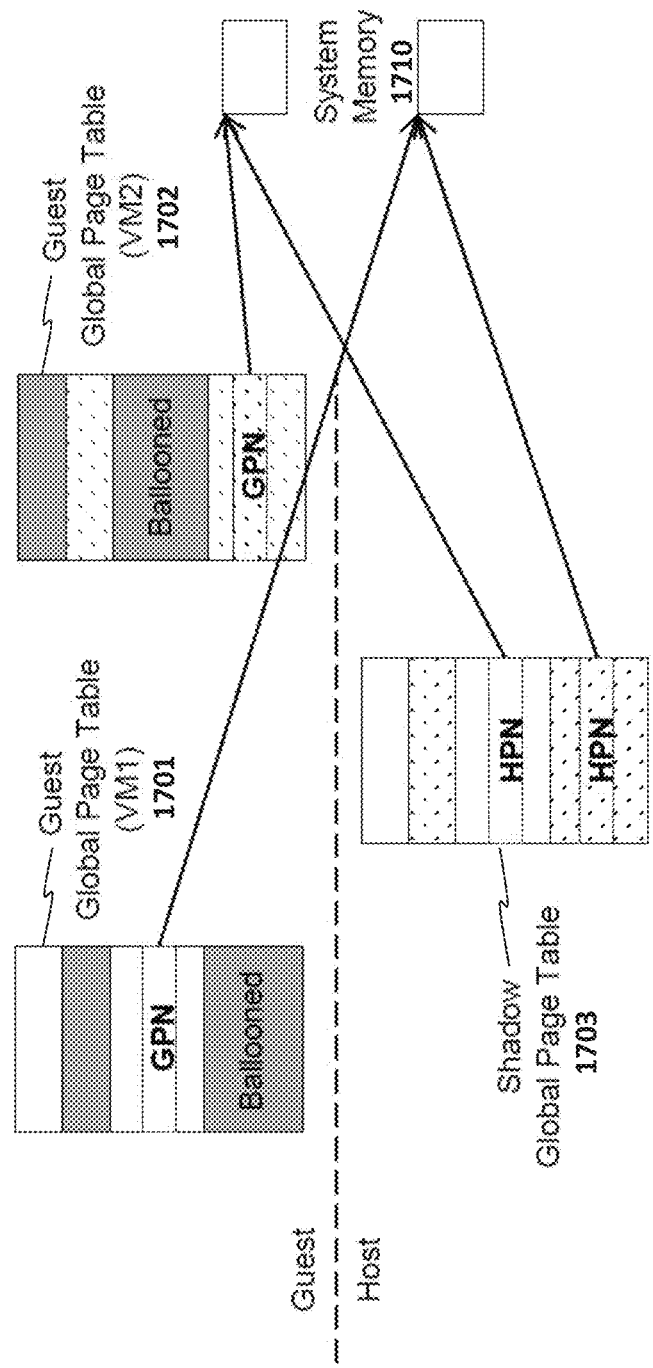
FIG. 17 illustrates an exemplary set of guest page tables and shadow global page tables.

As illustrated in FIG. 17, in one embodiment, the GPU page tables are virtualized with shared shadow global page tables 1703 and per-VM shadow local page tables 1701-1702. In particular, to achieve resource partitioning and address space ballooning, one embodiment implements shared shadow global page tables 1703 for all VMs 1431-1432. Each VM has its own guest global page table 1701 (VM1) and 1702 (VM2), translated from the graphics memory page number to the Guest Memory Page Number (GPN). The shadow global page table 1703 is then translated from the graphics memory page number to the Host Memory Page Number (HPN). The shared shadow global page table 1703 maintains the translations for all VMs, to support concurrent accesses from the CPU and GPU concurrently. Thus, this embodiment implements a single, shared shadow global page table 1703, by trapping guest PTE updates, as illustrated in FIG. 17. In one embodiment, the global page table 1703, in MMIO space, has 512K PTE entries, each pointing to a 4 KB system memory 1710 page, creating a 2 GB global graphics memory space. One embodiment audits the guest PTE values, according to the address space ballooning information, before updating the shadow PTE entries.

Figure 18:
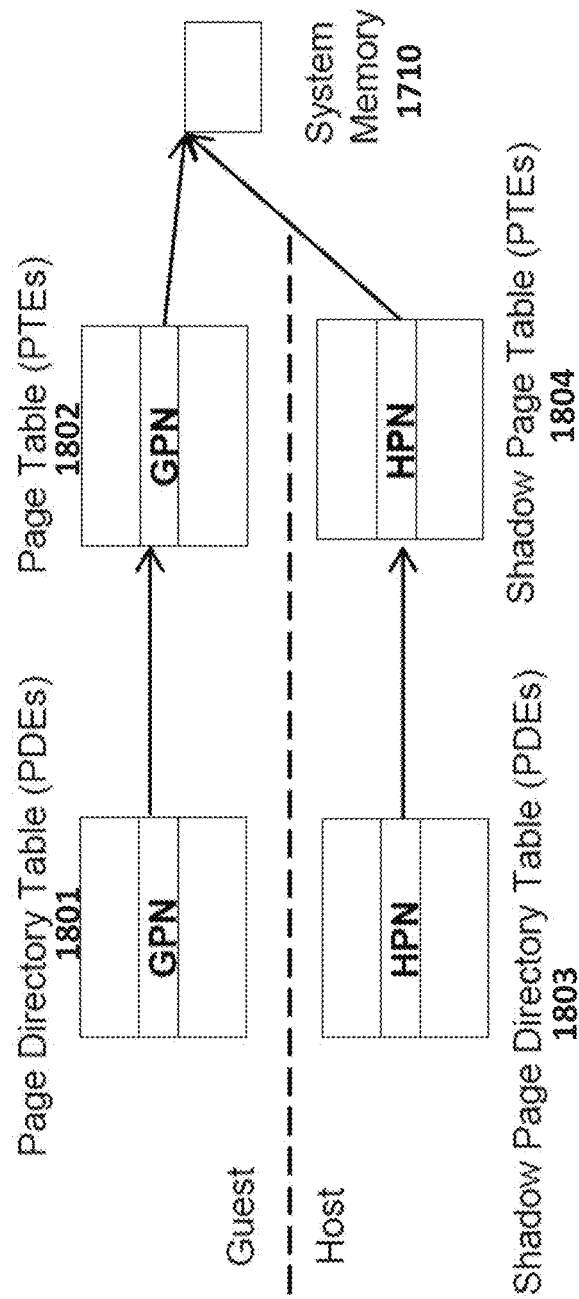
FIG. 18 illustrates an exemplary set of guest PDEs and PTEs and shadow PDEs and PTEs.

In one embodiment, to support pass-through of local graphics memory access, per-VM shadow local page tables are implemented. The local graphics memory is only accessible from the render engine. As illustrated in FIG. 18, the local page tables are two-level paging structures comprising page directory tables 1801 and page tables 1802. The first level Page Directory Entries (PDEs) 1801, located in the global page table, points to the second level Page Table Entries (PTEs) 1802, in the system memory. So, guest access to the PDE is trapped and emulated, through the implementation of the shared shadow global page table comprising a shadow page directory entry table 1803 and shadow page table 1804. One embodiment write-protects a list of guest PTE pages, for each VM, as the traditional shadow page table approach does. In one embodiment, the virtualization mediator 1422 synchronizes the shadow page tables 1803-1804 with the guest page tables 1801-1802, at the time of a write-protection page fault, and switches the shadow local page tables 1803-1804 at render context switches.

Pass-through is great for performance, but it must meet the following criteria in one embodiment for secure isolation. First, a VM must be prohibited from mapping unauthorized graphics memory pages. Second, all the GPU registers and commands, programmed by a VM, must be validated to only contain authorized graphics memory addresses. Last, this embodiment needs to address denial-of-service attacks, for example, a VM may deliberately trigger a lot of GPU hangs.

In one embodiment, CPU accesses to privileged I/O registers and PTEs are trap-and-emulated, under the control of the virtualization mediator 1422. Therefore a malicious VM can neither directly change the physical GPU context, nor map unauthorized graphics memory. CPU access to frame buffer and command buffer is also protected in one embodiment by the EPT.

On the other hand, one embodiment reuses the guest command buffer, for the GPU to execute directly for performance, as mentioned above, but, it may violate isolation. For example, a malicious command may contain an unauthorized graphics memory address. This problem may be addressed with smart shadowing as detailed below.

One embodiment performs isolation of GPU accesses. In particular, this embodiment audits graphics memory addresses in registers and commands, before the addresses are used by the GPU. This may be implemented at the time of trap-and-emulating the register access, and at the time of command submission.

One embodiment uses the device reset feature, widely supported in modern GPUs, to mitigate denial-of-service attacks. The GPU is so complex, that an application may cause the GPU to hang for many reasons. So, modern GPUs support device reset to dynamically recover the GPU, without the need to reboot the whole system. One embodiment uses this capability to recover from a variety of GPU hangs, caused by problematic commands from VMs 1431-1432. In the meantime, upon the detection of a physical GPU hang, this embodiment also emulates a GPU hang event, by removing all the VMs from the run queue, allowing each VM to detect and recover accordingly. A threshold may be maintained for every VM 1431-1432, and a VM is destroyed if the number of GPU hangs exceeds the threshold.

Balancing performance and security is challenging for full GPU virtualization. To guarantee no unauthorized address reference from the GPU, one embodiment audits the guest command buffer at the time of command submission. However there exists a window, between the time when the commands are submitted and when they are actually executed, so a malicious VM may break the isolation by modifying the commands within that window. In one embodiment, a shadowing mechanism, such as the shadow page table may be applied. However, it is originally designed for a case where the guest content is frequently modified and may result in significant performance overhead and additional complexity.

The programming models of the command buffers actually differ from that of the page tables. First, the primary buffer, structured as a ring buffer, is statically allocated with limited page numbers (e.g., 32 pages or 16 pages), and modification to submitted ring commands (from head to tail) is not allowed in one embodiment. It may be efficient enough to copy only the submitted commands to the shadow buffer. Second, the batch buffer pages are allocated on demand, and chained into the ring buffer. Once the batch buffer page is submitted, it will unlikely be accessed until the page is retired. The shadow buffer can be avoided for such one-time usage.

One embodiment implements a smart shadowing mechanism, with different protection schemes for different buffers, by taking advantage of their specific programming models. For example, write-protection may be applied to the batch buffer, which is unlikely modified (so the write emulation cost is very limited), and Lazy-Shadowing may be applied for the ring buffer, which is small in size and can be copied from the guest buffer to the shadow buffer with minimal cost.

One embodiment uses a lazy shadowing scheme to close the attack window on the ring buffer. This embodiment may create a separate ring buffer, referred to as the shadow ring buffer, to convey the actual commands submitted to the GPU. Guest submitted commands are copied from the guest ring buffer to the shadow ring buffer on demand, after the commands are audited.

Note that only the commands submitted to the GPU, are shadowed here. Guest access remains passed through to the guest ring buffer, without hypervisor 1410 intervention. The shadow buffer lazily synchronizes with the guest buffer, when the guest submits new commands. The shadow buffer is invisible to a VM, so there is no chance for a malicious VM to attack.

In one embodiment, the batch buffer pages are write-protected, and the commands are audited before submitting to the GPU for execution, to close the attack window. The write-protection is applied per page on demand, and is removed after the execution of commands in this page is completed by the GPU, which is detected by tracking the advance of ring head. Modification to the submitted commands is a violation of the graphics programming model per specification, so any guest modification to the submitted commands is viewed as an attack leading to the termination of the VM. In the meantime, the command buffer usage may not be page aligned, and the guest may use the free sub-page space for new commands.

One embodiment tracks the used and unused space of each batch buffer page, and emulates the guest writes to the unused space of the protected page for correctness. Lazy-shadowing works well for the ring buffer. It incurs an average number of 9K command copies per second, which is a small cost for a modern multi-GHz CPU. In the meantime, Write-Protection works well for the batch buffer, which, in one implementation, protects ~1700 pages with only ~560 trap-and-emulations per second, on average.

In one embodiment, an additional optimization is introduced to reduce the trap frequency, with minor modifications to the native graphics driver. According to the hardware specification, the graphics driver has to use a special programming pattern at the time of accessing certain MMIO registers, with up to 7 additional MMIO register accesses, to prevent the GPU from entering power saving mode. It doesn't incur an obvious cost in the native world, but it may become a big performance challenge, in the embodiments described herein due to the induced mediation overhead. One embodiment of a GPU power management design provides a chance to optimize. Specifically, one embodiment relies on the privileged VM 1420 to manage the physical GPU power, while the guest power management is disabled. Based on this, the native graphics driver 1428 may be optimized to skip the additional MMIO register accesses, when it runs in the virtualized environment. In one embodiment, this optimization reduces the trap frequency by 60%, on average.

In one embodiment, the graphics driver 1428 identifies whether it is in a native environment or a virtualization environment by the information in the virt_info MMIO window (discussed above). The definition of virt_info may be pushed into the GPU hardware specification, so backward compatibility can be followed by future native graphics driver and future GPU generations.

The underlying principles and architecture described herein may be implemented on various different GPUs. The notion of a frame buffer, command buffer, I/O registers, and page tables, are all abstracted very well in modern GPUs. Some GPUs may use on-die graphics memory; however, the graphics memory resource partitioning and address space ballooning mechanisms described herein are also amenable to those GPUs. In addition, the shadowing mechanism, for both the page table and command buffer, is generalized for different GPUs. The GPU scheduler 1426 is generic while the specific context switch sequence may be different.

Furthermore, the core components described herein are hypervisor agnostic. Although one implementation is on a type-1 hypervisor, these techniques can be easily extended to a type-2 hypervisor, such as a kernel-based virtual machine (KVM), with hooks to host MMIO access (e.g., using a Linux graphics driver). For example, one can register callbacks on the I/O access interfaces, in the host graphics driver, so the virtualization mediator 1424 can intercept and emulate the host driver accesses to the privileged GPU resources.

Although partitioning graphics memory resources may limit scalability, this issue can be solved in two orthogonal ways. One way is to make better use of the existing graphics memory, by implementing a dynamic resource ballooning mechanism, with additional driver cooperation, to share the graphics memory among vGPUs. Another way is to increase available graphics memory resources, by adding more graphics memory in future generation GPUs.

One additional challenge of full GPU virtualization, is the dependency of different graphics engines, such as 3D, blitter, and media. The graphics driver may use semaphore commands to synchronize shared data structures among the engines, while the semaphore commands may not be pre-empted. It then brings the issue of inter-engine dependency, and leads to a gang scheduling policy to always schedule all engines together; however, it impacts the sharing efficiency. This limitation can be addressed with a hybrid scheme combining both per-engine scheduling and gang scheduling, through constructing an inter-engine dependency graph, when the command buffers are audited. The GPU scheduler 1426 can then choose per-engine scheduling and gang scheduling policies dynamically, according to the dependency graph.

Figure 19:
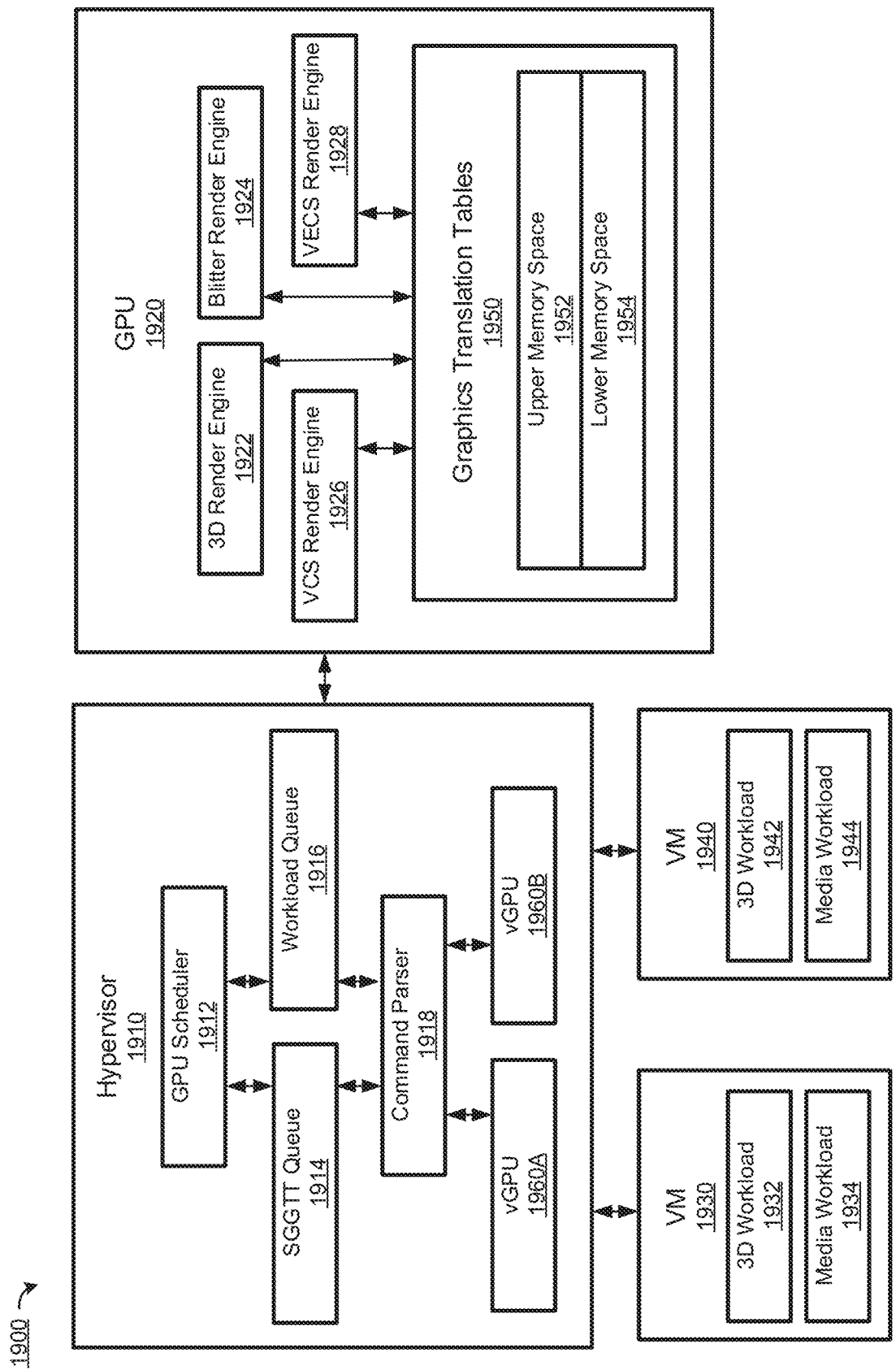
FIG. 19 illustrates an exemplary virtualized graphics processing architecture including virtual graphics processing units (vGPUs)

FIG. 19 illustrates additional details for one embodiment of a graphics virtualization architecture 1900 which includes multiple VMs, e.g., VM 1930 and VM 1940, managed by hypervisor 1910, including access to a full array of GPU features in a GPU 1920. In various embodiments, hypervisor 1910 may enable VM 1930 or VM 1940 to utilize graphics memory and other GPU resources for GPU virtualization. One or more virtual GPUs (vGPUs), e.g., vGPUs 1960A and 1960B, may access the full functionality provided by GPU 1920 hardware based on the GPU virtualization technology. In various embodiments, hypervisor 1910 may track, manage resources and lifecycles of the vGPUs 1960A and 1960B as described herein.

In some embodiments, vGPUs 1960A-B may include virtual GPU devices presented to VMs 1930, 1940 and may be used to interactive with native GPU drivers (e.g., as described above with respect to FIG. 14). VM 1930 or VM 1940 may then access the full array of GPU features and use virtual GPU devices in vGPUs 1960A-B to access virtual graphics processors. For instance, once VM 1930 is trapped into hypervisor 1910, hypervisor 1910 may manipulate a vGPU instance, e.g., vGPU 1960A, and determine whether VM 1930 may access virtual GPU devices in vGPU 1960A. The vGPU context may be switched per quantum or event. In some embodiments, the context switch may happen per GPU render engine such as 3D render engine 1922 or blitter render engine 1924. The periodic switching allows multiple VMs to share a physical GPU in a manner that is transparent to the workloads of the VMs.

GPU virtualization may take various forms. In some embodiments, VM 1930 may be enabled with device passthrough, where the entire GPU 1920 is presented to VM 1930 as if they are directly connected. Much like a single central processing unit (CPU) core may be assigned for exclusive use by VM 1930, GPU 1920 may also be assigned for exclusive use by VM 1930, e.g., even for a limited time. Another virtualization model is timesharing, where GPU 1920 or portions of it may be shared by multiple VMs, e.g., VM 1930 and VM 1940, in a fashion of multiplexing. Other GPU virtualization models may also be used by apparatus 1900 in other embodiments. In various embodiments, graphics memory associated with GPU 1920 may be partitioned, and allotted to various vGPUs 1960A-B in hypervisor 1910.

In various embodiments, graphics translation tables (GTTs) may be used by VMs or GPU 1920 to map graphics processor memory to system memory or to translate GPU virtual addresses to physical addresses. In some embodiments, hypervisor 1910 may manage graphics memory mapping via shadow GTTs, and the shadow GTTs may be held in a vGPU instance, e.g., vGPU 1960A. In various embodiments, each VM may have a corresponding shadow GTT to hold the mapping between graphics memory addresses and physical memory addresses, e.g., machine memory addresses under virtualization environment. In some embodiments, the shadow GTT may be shared and maintain the mappings for multiple VMs. In some embodiments, each VM 1930 or VM 1940, may include both per-process and global GTTs.

In some embodiments, apparatus 1900 may use system memory as graphics memory. System memory may be mapped into multiple virtual address spaces by GPU page tables. Apparatus 1900 may support global graphics memory space and per-process graphics memory address space. The global graphics memory space may be a virtual address space, e.g., 2 GB, mapped through a global graphics translation table (GGTT). The lower portion of this address space is sometimes called the aperture, accessible from both the GPU 1920 and CPU (not shown). The upper portion of this address space is called high graphics memory space or hidden graphics memory space, which may be used by GPU 1920 only. In various embodiments, shadow global graphics translation tables (SGGTTs) may be used by VM 1930, VM 1940, hypervisor 1910, or GPU 1920 for translating graphics memory addresses to respective system memory addresses based on a global memory address space.

In full GPU virtualization, a static global graphics memory space partitioning scheme may face a scalability problem. For example, for a global graphics memory space of 2 GB, the first 512 megabyte (MB) virtual address space may be reserved for aperture, and the rest of them, 1536 MB, may become the high (hidden) graphics memory space. With the static global graphics memory space partitioning scheme, each VM with full GPU virtualization enabled may be allotted with 128 MB aperture and 384 MB high graphics memory space. Therefore, the 2 GB global graphics memory space may only accommodate a maximum of four VMs.

Besides the scalability problem, VMs with limited graphics memory space may also suffer performance degradation. Sometimes, severe performance downgrade may be observed in some media-heavy workloads of a media application when it uses GPU media hardware acceleration extensively. As an example, to decode one channel 1080p H.264/Advanced Video Coding (AVC) bit stream, at least 40 MB of graphics memory may be needed. Thus, for 10 channels of 1080p H264/AVC bit stream decoding, at least 400 MB of graphics memory space may be needed. Meanwhile, some graphic memory space may have to be set aside for surface composition/color conversion, switching display frame buffer during the decoding process, etc. In this case, 512 MB of graphics memory space per VM may be insufficient for a VM to run multiple video encoding or decoding.

In various embodiments, apparatus 100 may achieve GPU graphics memory overcommitment with on-demand SGGTTs. In some embodiments, hypervisor 1910 may construct SGGTTs on demand, which may include all the to-be-used translations for graphics memory virtual addresses from different GPU components' owner VMs.

In various embodiments, at least one VM managed by hypervisor 1910 may be allotted with more than static partitioned global graphics memory address space as well as memory. In some embodiments, at least one VM managed by hypervisor 1910 may be allotted with or able to access the entire high graphics memory address space. In some embodiments, at least one VM managed by hypervisor 1910 may be allotted with or able to access the entire graphics memory address space.

Hypervisor 1910 may use command parser 1918 to detect the potential memory working set of a GPU rendering engine for the commands submitted by VM 1930 or VM 1940. In various embodiments, VM 1930 may have respective command buffers (not shown) to hold commands from 3D workload 1932 or media workload 1934. Similarly, V M 1940 may have respective command buffers (not shown) to hold commands from 3D workload 1942 or media workload 1944. In other embodiments, VM 1930 or VM 1940 may have other types of graphics workloads.

In various embodiments, command parser 1918 may scan a command from a VM and determine if the command contains memory operands. If yes, the command parser may read the related graphics memory space mappings, e.g., from a GTT for the VM, and then write it into a workload specific portion of the SGGTT. After the whole command buffer of a workload gets scanned, the SGGTT that holds memory address space mappings associated with this workload may be generated or updated. Additionally, by scanning the to-be-executed commands from VM 1930 or VM 1940, command parser 1918 may also improve the security of GPU operations, such as by mitigating malicious operations.

In some embodiments, one SGGTT may be generated to hold translations for all workloads from all VMs. In some embodiments, one SGGTT may be generated to hold translations for all workloads, e.g., from one VM only. The workload specific SGGTT portion may be constructed on demand by command parser 1918 to hold the translations for a specific workload, e.g., 3D workload 1932 from VM 1930 or media workload 1944 from VM 1940. In some embodiments, command parser 1918 may insert the SGGTT into SGGTT queue 1914 and insert the corresponding workload into workload queue 1916.

In some embodiments, GPU scheduler 1912 may construct such on-demand SGGTT at the time of execution. A specific hardware engine may only use a small portion of the graphics memory address space allocated to VM 1930 at the time of execution, and the GPU context switch happens infrequently. To take advantage of such GPU features, hypervisor 1910 may use the SGGTT for VM 1930 to only hold the in-execution and to-be-executed translations for various GPU components rather than the entire portion of the global graphics memory address space allotted to VM 1930.

GPU scheduler 1912 for GPU 1920 may be separated from the scheduler for CPU in apparatus 1900. To take the advantage of the hardware parallelism in some embodiments, GPU scheduler 1912 may schedule the workloads separately for different GPU engines, e.g., 3D render engine 1922, blitter render engine 1924, video command streamer (VCS) render engine 1926, and video enhanced command streamer (VECS) render engine 1928. For example, VM 1930 may be 3D intensive, and 3D workload 1932 may need to be scheduled to 3D render engine 1922 at a moment. Meanwhile, VM 1940 may be media intensive, and media workload 1944 may need to be scheduled to VCS render engine 1926 and/or VECS render engine 1928. In this case, GPU scheduler 1912 may schedule 3D workload 1932 from VM 1930 and media workload 1944 from VM 1940 separately.

In various embodiments, GPU scheduler 1912 may track in-executing SGGTTs used by respective render engines in GPU 1920. In this case, hypervisor 1910 may retain a per-render engine SGGTT for tracking all in-executing graphic memory working sets in respective render engines. In some embodiments, hypervisor 1910 may retain a single SGGTT for tracking all in-executing graphic memory working sets for all render engines. In some embodiments, such tracking may be based on a separate in-executing SGGTT queue (not shown). In some embodiments, such tracking may be based on markings on SGGTT queue 1914, e.g., using a registry. In some embodiments, such tracking may be based on markings on workload queue 1916, e.g., using a registry.

During the scheduling process, GPU scheduler 1912 may examine the SGGTT from SGGTT queue 1914 for a to-be-scheduled workload from workload queue 1916. In some embodiments, to schedule the next VM for a particular render engine, GPU scheduler 1912 may check whether the graphic memory working sets of the particular workload used by the VM for that render engine conflict with the in-executing or to-be-executed graphic memory working sets by that render engine. In other embodiments, such conflict checks may extend to check with the in-executing or to-be-executed graphic memory working sets by all other render engines. In various embodiments, such conflict checks may be based on the corresponding SGGTTs in SGGTT queue 1914 or based on SGGTTs retained by hypervisor 1910 for tracking all in-executing graphic memory working sets in respective render engines as discussed hereinbefore.

If there is no conflict, GPU scheduler 1912 may integrate the in-executing and to-be-executed graphic memory working sets together. In some embodiments, a resulting SGGTT for the in-executing and to-be-executed graphic memory working sets for the particular render engine may also be generated and stored, e.g., in SGGTT queue 1914 or in other data storage means. In some embodiments, a resulting SGGTT for the in-executing and to-be-executed graphic memory working sets for all render engines associated with one VM may also be generated and stored if the graphics memory addresses of all these workloads do not conflict with each other.

Before submitting a selected VM workload to GPU 1920, hypervisor 1910 may write corresponding SGGTT pages into GPU 1920, e.g., to graphics translation tables 1950. Thus, hypervisor 1910 may enable this workload to be executed with correct mappings in the global graphics memory space. In various embodiments, all such translation entries may be written into graphics translation tables 1950, either to lower memory space 1954 or upper memory space 1952. Graphics translation tables 1950 may contain separate tables per VM to hold for these translation entries in some embodiments. Graphics translation tables 1950 may also contain separate tables per render engine to hold for these translation entries in other embodiments. In various embodiments, graphics translation tables 1950 may contain, at least, to-be-executed graphics memory addresses.

However, if there is a conflict determined by GPU scheduler 1912, GPU scheduler 1912 may then defer the schedule-in of that VM, and try to schedule-in another workload of the same or a different VM instead. In some embodiments, such conflict may be detected if two or more VMs may attempt to use a same graphics memory address, e.g., for a same render engine or two different render engines. In some embodiments, GPU scheduler 1912 may change the scheduler policy to avoid selecting one or more of the rendering engines, which have the potential to conflict with each other. In some embodiments, GPU scheduler 1912 may suspend the execution hardware engine to mitigate the conflict.

In some embodiments, memory overcommitment scheme in GPU virtualization as discussed herein may co-exist with static global graphics memory space partitioning schemes. As an example, the aperture in lower memory space 1954 may still be used for static partition among all VMs. The high graphics memory space in upper memory space 1952 may be used for the memory overcommitment scheme. Compared to the static global graphics memory space partitioning scheme, memory overcommit scheme in GPU virtualization may enable each VM to use the entire high graphics memory space in upper memory space 1952, which may allow some applications inside each VM to use greater graphic memory space for improved performance.

With static global graphics memory space partitioning schemes, a VM initially claiming a large portion of memory may only use a small portion at runtime, while other VMs may be in the status of shortage of memory. With memory overcommitment, a hypervisor may allocate memory for VMs on demand, and the saved memory may be used to support more VMs. With SGGTT based memory overcommitment, only graphic memory space used by the to-be-executed workloads may be allocated at runtime, which saves graphics memory space and supports more VMs to access GPU 1920.

Apparatus and Method for Pattern-Driven Page Tables

As discussed above, GPU page table shadowing (e.g., using a shadow GGTT/PPGTT) is one technique used in full GPU virtualization. Guest GPU page table entries contain Guest Physical Addresses (GPAs) which must be translated into Host Physical Address (HPAs) as the DMA destination. However, when multiple VMs share one pGPU device, the input-output memory management unit (IOMMU) cannot be used to perform hardware GPA-to-HPA translation because there is only one PCI requestor ID. Thus, like CPU page table shadowing, write-protection is enforced on the guest page table pages, so all guest writes cause a page fault and then the hypervisor can translate-and-update the corresponding shadow page table, as shown in FIG. 18 (discussed above). Actual write protection faults depends on the programming model, and high write protection faults could lead to a significant virtualization overhead and thus greatly impact the overall GPU virtualization performance. For example, in one test, up to a 20× slowdown was observed in a H.264 media transcoding benchmark in a VM, when compared to bare metal performance, due to excessive write protection page faults.

Things become more complex with the introduction of Shared Virtual Memory (SVM), which directly shares the CPU page table with the GPU to enable a more effective programming model. For example, an user level application can directly submit virtual addresses (GVA) to the device, bypassing the kernel-mode driver, and then the device can use GVA directly as the DMA destination. It is relatively easy to support a guest SVM in GPU pass-through mode, by using two-level translation structures (GVA→GPA→HPA) in the IOMMU. However it is difficult to use the two-level translation structures for multiple VMs (potentially having conflicting GPA address spaces), because there is only one PCI requestor ID available. One technique to address this issue is to introduce a new input-output virtual address (IOVA) space, which is partitioned between multiple VMs. Two-level translation structures are then used to conduct GVA→IOVA→HPA translations. This means that the first level translation structure, i.e., the shared CPU page table, needs to be shadowed for the GPA→IOVA translation.

However, this CPU page table shadowing technique is very complex and error prone to achieve an efficient implementation. For example, a comprehensive shadow page table needs to track all the page table pages (for the purpose of write-protection), which is difficult and the VMM usually has to track the parent's page of each guest's PDE/PTE (i.e., a reverse map on the shadow page table side). This is complicated when a guest page table is temporary not effective (e.g., not pointed by the control register such as CR3), and/or a page table page is freed completely to be reused as a data page. Complexity and extra overhead are required to handle a much larger CPU-GPU combined working set due to CPU page table sharing, compared to existing GPU page table shadowing. In the end, the actual performance with shared CPU page tables may be even worse than a built using legacy implementations without page table sharing (SVM disabled).

The above is the major reason why SVM in full GPU virtualization is not supported today. Some existing techniques have been used to optimize GPU page table shadowing. For example, in the co-pending application Ser. No. 14/777,738, An hybrid On Demand Per-Process Graphics Translation Table Shadowing Mechanism for Efficient Media Cloud Usage, Filed Dec. 24, 2014, a GPU page table is write-protected in an on-demand fashion, based on heuristics of page table access patterns. This can greatly improve virtual media transcoding performance for traditional shadow GGTT/PPGTT approaches. However it may not meet the requirements of SVM virtualization due to the large CPU working set which cannot be easily optimized with suggested heuristics.

One embodiment of the invention addresses these limitations using a Pattern-driven Page Table Shadowing (PPTS) framework for both shared CPU page tables (e.g., SVM) and traditional GPU page tables (e.g., GGTT/PPGTT). This framework attempts to predict the current GPU working set, based on an analysis of the GPU commands submitted from each VM, and then conducts an on-demand lazy shadow synchronization to ensure that all the necessary mappings are up-to-date (i.e., stored just prior to being used, before the GPU commands are submitted to the physical GPU).

Prediction of the current GPU working set can greatly reduce the write protection faults, because there is no need to write-protect PTEs which are not directly related to the current working set, or even completely unused by the GPU (e.g. CPU-only usage in the SVM case). On-demand lazy shadow synchronization can further reduce the write protection faults based on page table access patterns.

Another optimization of PPTS described below is Speculative Page Request (SPR), which speculatively request non-present pages (non-allocated or swapped-out to disk) based on the predicted working set, before the commands are submitted to the GPU. This can help avoid more heavyweight IOMMU page faults when the GPU attempts to access them. The proposed PPTS technique can be also applied to other acceleration devices such as field-programmable gate array (FPGA) accelerators, if they support shared address space between the CPU and the device, in various virtualization usages.

In one embodiment, utilizes the GPU programming model, which requires the driver to explicitly notify GPU for all assigned tasks. In this embodiment, the GPU will touch the resources belonging to assigned tasks only when the tasks are submitted in GPU commands (e.g., through the MMIO based "tail" register or memory based "doorbells").

These embodiments provide optimization in a virtualized environment, because these submissions can be trapped by hypervisor, and the submitted commands may be analyzed to understand the real resource requirements in a lazy manner.

Figure 20:
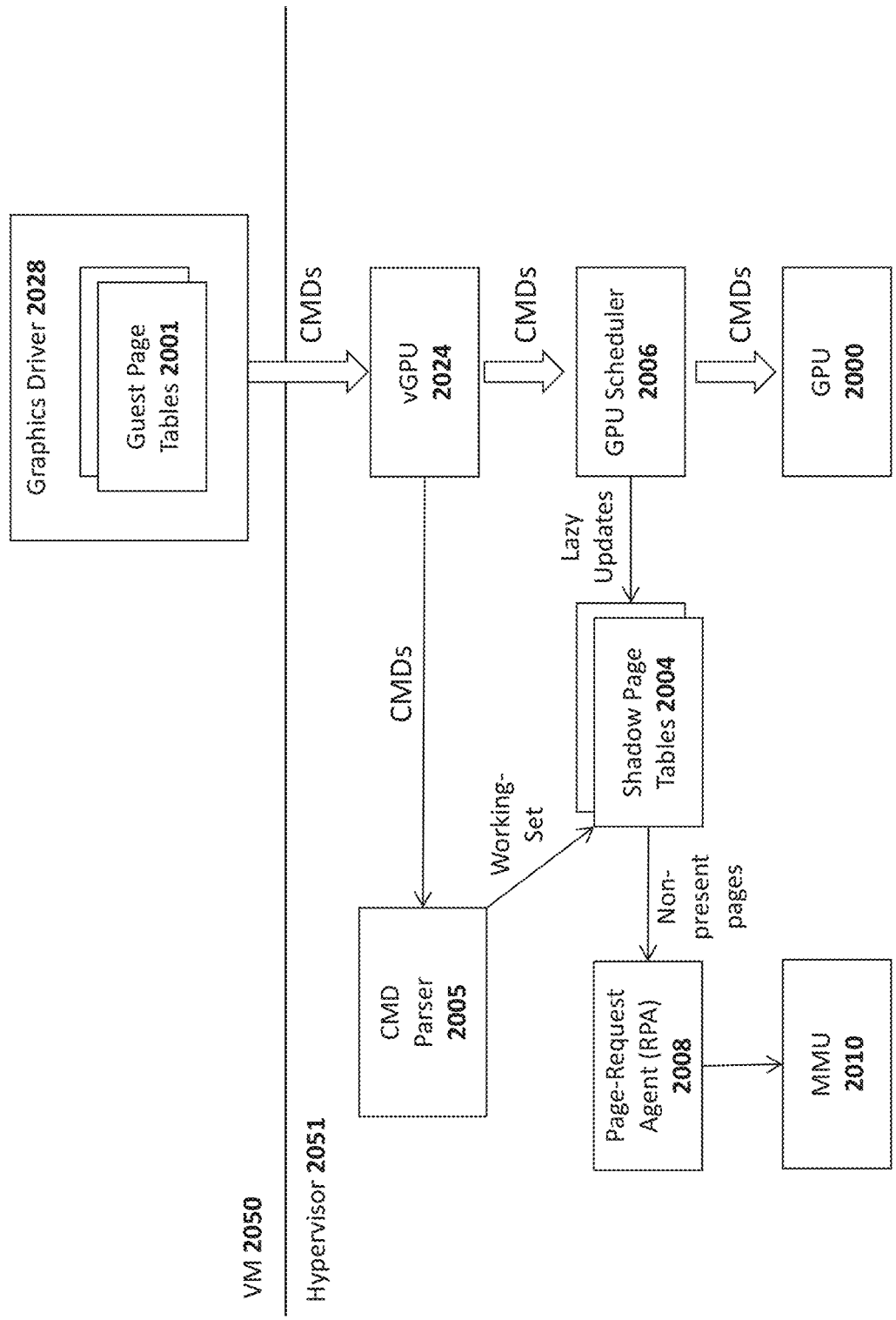
FIG. 20 illustrates one embodiment of the invention for maintaining and updating shadow page tables.

One embodiment of the Pattern-driven Page Table Shadowing (PPTS) framework is illustrated in FIG. 20 which shows an exemplary virtual machine 2050 running on a hypervisor 2051. This embodiment may be applied to solve the new CPU page table shadowing challenges resulting from SVM, and also to improve existing GPU page table shadowing.

1. GPU Working Set Prediction

One embodiment employs full GPU virtualization which trap-and-emulates privileged operations from the guest/VM 2050, including the submission of GPU commands. When the vGPU 2024 device model receives a new command buffer, it is forwarded to a CMD parser 2005 for fine-grained analysis. In one embodiment, the CMD parser 2005 analyzes the command operands and records all the memory pages which may be used by the submitted GPU commands. In another embodiment, compiler technology may be used to do more accurate prediction (e.g. skipping code branches which definitely won't be executed based on the input parameters) so a more reduced but accurate set of memory pages can be constructed.

In one embodiment, the CMD parser 2005 records the working set (i.e. a list of memory pages) associated with each submitted command buffer which are provided to shadow page tables 2004 (i.e., storing those PTEs which are utilized by the working set). The working set comprises the portion relevant to the submitted commands, which is the maximum possible page table to be utilized. Only memory pages within current working set needs fine-grained synchronization between shadow page table and guest page table. Other pages outside of current working set can be synchronized less frequently. Consequently, it significantly reduces the number of page tables entries to be write-protected, which would represent the entire CPU address space without the use of these techniques.

2. On-Demand Lazy Shadow Synchronization

In one embodiment, the GPU scheduler 2006 provides lazy updates to the shadow page tables 2004. Based on the predicted working set and historical page table access patterns, there are several lazy page table shadowing policies can be adopted.

In one embodiment, under a full reconstruction policy, no write-protection is used. When the GPU scheduler 2006 prepares to submit a guest command buffer, it synchronize the shadow PTEs of the shadow page table 2004 from the guest PTEs of the guest page table 2001, only for the predicted working set belonging to the associated command buffer. There is no write-protection overhead incurred in this embodiment, however the reconstruction may take long time if the predicted working set is too large.

Using a partial shadowing policy, after the first reconstruction of the shadow PTEs in the shadow page table 2004, the current working set is added into a per-VM global working set. All the guest PTEs of the global working set are then write-protected moving forward. For each newly submitted command buffer, then shadow PTEs are reconstructed if they have not been in the global working set. Otherwise the shadow PTEs are up-to-date already due to the write-protection An on-demand shadowing policy employed in one embodiment is similar to partial shadowing, but the per-VM global working set is dynamically updated based on reference frequency from the CMD parser 2005 and page table access patterns. Less frequently-referenced PTEs can reside in the per-VM global working set longer, due to less of an opportunity to reconstruct them so write-protection is more efficient to reduce the latency in the CMD submission path. Otherwise, the most frequently-referenced PTEs are removed from the global working set and moved back to the full reconstruction model, since frequent write-protection faults hurt performance.

3. Speculative Page Request

In one embodiment, the IOMMU supports page faults, so when the CPU page table is shared with the GPU 2000, non-present pointer addresses will trigger IOMMU page faults when the GPU accesses these pointers. In one embodiment, the IOMMU driver will then request the hypervisor MMU 2010 to fill the PTE (either allocate a new page or swap in an existing page). However an IOMMU page fault is more heavy-weight compared to a CPU page fault, due to the longer path and request/response protocol between the IOMMU and end device.

In one embodiment of the invention, proactive page requests can be conducted based on the predicted working set. Specifically, in this embodiment, if one or more PTEs of the predicted working set are not present, a Page-Request-Agent (PRA) 2008 can be utilized to speculatively trigger a CPU page fault or directly invoke the hypervisor IOMMU 2010 to allocate/swap-in required pages to the shadow page tables 2004, before the commands are executed by the GPU 2000. This can remove a significant amount of unnecessary IOMMU page faults and thus increase the overall performance.

In another embodiment, compiler technology can be applied to the CMD parser 2005 to analyze likelihood of a given page to be accessed within the submitted commands, providing another hint to the speculative page request.

Figure 21:
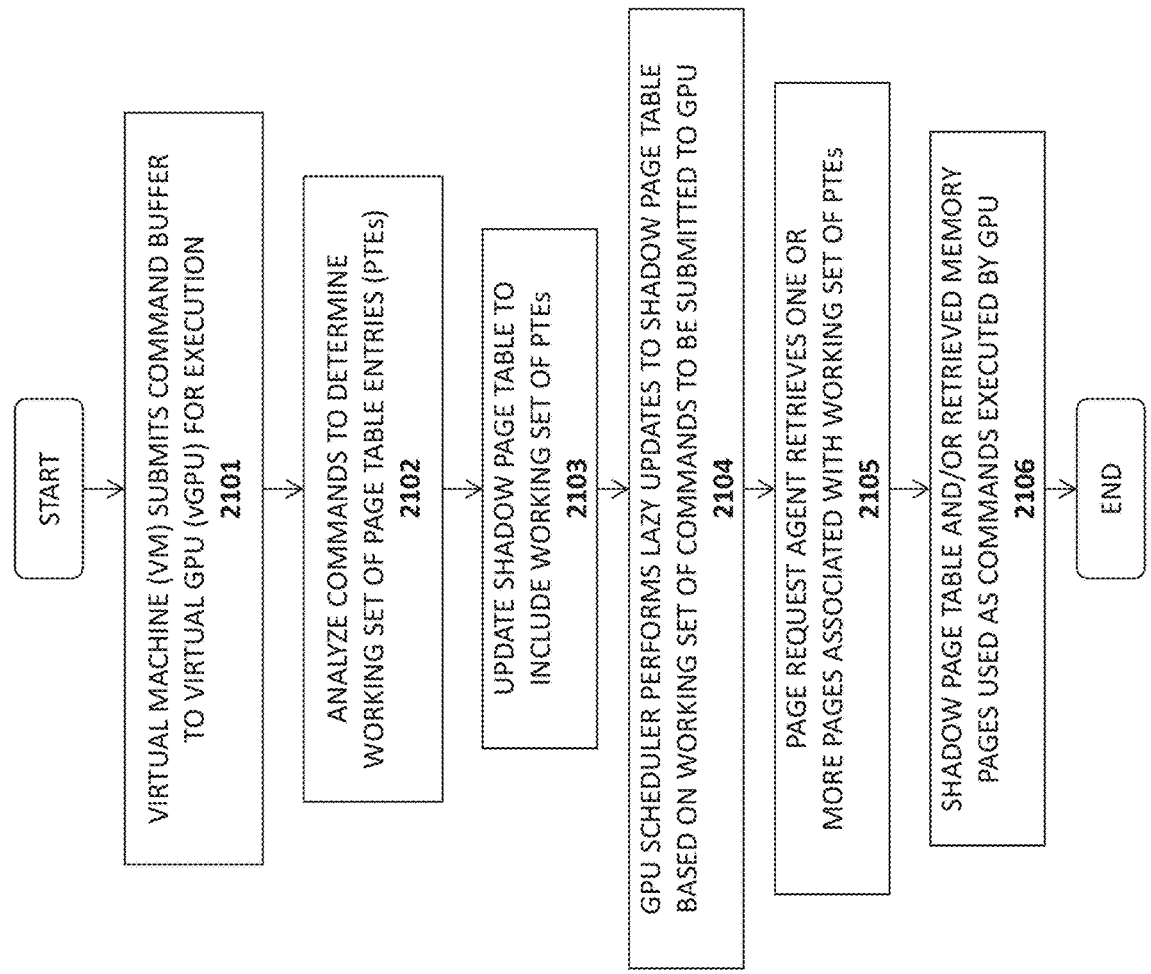
FIG. 21 illustrates a method in accordance with one embodiment of the invention.

A method in accordance with one embodiment of the invention is illustrated in FIG. 21. The method may be implemented within the context of the system architectures described above but is not limited to any particular system architecture.

At 2101, the virtual machine (VM) submits a command buffer comprising a current working set of commands to a virtual GPU (vGPU) for execution. In one embodiment, the vGPU is implemented by a hypervisor sharing a physical GPU with the different VMs. At 2102, the current working set of commands are analyzed to determine a working set of page table entries (PTEs). At 2103, the shadow page table is updated to include the working set of PTEs (i.e., the PTEs corresponding to the working set of commands). At 2104, the GPU scheduler performs lazy updates to the shadow page table based on the working set of commands. 2104 is optional if write-protection is enforced on the whole predicted working set. In one embodiment, the updates are performed prior to the commands being executed by the GPU. In one embodiment, at 2105, a page request agent retrieves one or more pages associated with the working set of PTEs (e.g., via a memory management unit (MMU)) and, at 2106, the shadow page table and/or retrieved memory pages are used as the working set of commands are executed by the GPU.

Shared virtual memory (SVM) results in new challenges to full GPU virtualization (e.g., such as those related to CPU page table shadowing). The complexity and performance overhead of traditional CPU page table shadowing make SVM challenging to implement. The embodiments of the invention provide a novel solution based on a prediction of the active working set of PTEs and on-demand lazy shadow synchronization, which can greatly reduce write protection faults compared to traditional CPU page table shadowing. These embodiments can also reduce IOMMU page faults through a proactive page request model.

In this detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including,"

"having," and the like, as used with respect to embodiments of the present disclosure, are synonymous.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A apparatus comprising:
   a graphics processing unit (GPU) to process graphics commands and responsively render a plurality of image frames;
   a hypervisor to virtualize the GPU to share the GPU among a plurality of virtual machines (VMs);
   a first guest page table managed within a first VM, the first guest page table comprising a plurality of page table entries;
   a first shadow page table managed by the hypervisor and comprising page table entries corresponding to the page table entries of the first guest page table; and
   a command parser to analyze a current working set of commands submitted from the first VM to the GPU, the command parser to responsively update the first shadow page table responsive to determining a set of page table entries predicted to be used based on the analysis of the working set of commands.

2. The apparatus as in claim 1 further comprising:
   a GPU scheduler of the hypervisor to perform one or more page table entry updates to the first shadow page table responsive to scheduling commands from the working set of commands for execution on the GPU.

3. The apparatus as in claim 1 further comprising:
   a page request agent to determine memory pages which will be required for the GPU to execute one or more of the commands in the working set of commands and to responsively cause a memory management unit to retrieve the memory pages.

4. The apparatus as in claim 3 wherein the page request agent is to determine the memory pages to be retrieved by reading one or more page table entries from the first shadow page table.

5. The apparatus as in claim 4 wherein the page request agent is to speculatively trigger a page fault or directly invoke a hypervisor memory management unit (MMU) to retrieve the memory pages.

6. The apparatus as in claim 1 wherein the VM is to submit the working set of commands to a command buffer and to provide the command buffer to the hypervisor to schedule the working set of commands for execution by the GPU.

7. The apparatus as in claim 6 wherein the hypervisor is to trap-and-emulate privileged operations from the VM and to pass through non-privileged operations to the GPU.

8. The apparatus as in claim 1 wherein the first shadow page table is to be updated based on a detected reference frequency of commands from the command parser and detected page table access patterns.

9. A system comprising:
   a memory to store data and program code;
   a central processing unit (CPU) comprising an instruction cache for caching a portion of the program code and a data cache for caching a portion of the data, the CPU further comprising execution logic to execute the program code and responsively process the data, at least a portion of the program code comprising graphics commands;
   a graphics processing unit (GPU) to process the graphics commands and responsively render a plurality of image frames;
   a hypervisor to virtualize the GPU to share the GPU among a plurality of virtual machines (VMs);

a first guest page table managed within a first VM, the first guest page table comprising a plurality of page table entries;

a first shadow page table managed by the hypervisor and comprising page table entries corresponding to the page table entries of the first guest page table; and a command parser to analyze a current working set of commands submitted from the first VM to the GPU, the command parser to responsively update the first shadow page table responsive to determining a set of page table entries predicted to be used based on the analysis of the working set of commands.

10. The system as in claim 9 further comprising:

a GPU scheduler of the hypervisor to perform one or more page table entry updates to the first shadow page table responsive to scheduling commands from the working set of commands for execution on the GPU.

11. The system as in claim 9 further comprising:

a page request agent to determine memory pages which will be required for the GPU to execute one or more of the commands in the working set of commands and to responsively cause a memory management unit to retrieve the memory pages.

12. The system as in claim 11 wherein the page request agent is to determine the memory pages to be retrieved by reading one or more page table entries from the first shadow page table.

* * * * *